US011095544B1

(12) United States Patent
Asesh et al.

(10) Patent No.: US 11,095,544 B1
(45) Date of Patent: Aug. 17, 2021

(54) ROBUST ANOMALY AND CHANGE DETECTION UTILIZING SPARSE DECOMPOSITION

(71) Applicant: Adobe Inc., San Jose, CA (US)

(72) Inventors: Aishwarya Asesh, Salt Lake City, UT (US); Sunav Choudhary, Bokaro Steel (IN); Shiv Kumar Saini, Jhunjhunu (IN); Chris Challis, Alpine, UT (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/904,249

(22) Filed: Jun. 17, 2020

(51) Int. Cl.
*G06F 16/2458* (2019.01)
*G06F 16/248* (2019.01)
*G06F 7/00* (2006.01)
*H04L 12/26* (2006.01)

(52) U.S. Cl.
CPC ................................ *H04L 43/0876* (2013.01)

(58) Field of Classification Search
CPC .. G06F 16/2474; G06F 16/28; G06F 16/2774; G06F 16/248; H04L 63/1425; H04L 43/0876
See application file for complete search history.

(56) References Cited

U.S. PATENT DOCUMENTS

| | | | | |
|---|---|---|---|---|
| 10,715,393 | B1* | 7/2020 | Madhavan | H04L 41/16 |
| 2010/0063773 | A1* | 3/2010 | Marvasti | G06F 11/3438 |
| | | | | 702/179 |
| 2014/0310235 | A1* | 10/2014 | Chan | G06F 11/3003 |
| | | | | 707/603 |
| 2016/0210556 | A1* | 7/2016 | Ben Simhon | G06N 3/08 |
| 2017/0155570 | A1* | 6/2017 | Maheshwari | H04L 43/50 |
| 2019/0138643 | A1 | 5/2019 | Saini et al. | |
| 2019/0235944 | A1* | 8/2019 | Velipasaoglu | G06F 11/0787 |
| 2019/0236177 | A1* | 8/2019 | Jain | G06F 16/2365 |
| 2020/0183946 | A1* | 6/2020 | Pelloin | G06F 16/2379 |
| 2020/0210393 | A1* | 7/2020 | Beaver | G06F 17/18 |
| 2020/0267229 | A1* | 8/2020 | Hendrickson | G06F 16/24578 |

OTHER PUBLICATIONS

C. C. Aggarwal, Outlier analysis, in Data mining, Springer, 2015, pp. 237-263.

(Continued)

*Primary Examiner* — Nicholas R Taylor
*Assistant Examiner* — Christopher B Robinson
(74) *Attorney, Agent, or Firm* — Keller Jolley Preece

(57) ABSTRACT

The present disclosure describes systems, non-transitory computer-readable media, and methods for determining latent components of a metrics time series and identifying anomalous data within the metrics time series based on one or both of spikes/dips and level changes from the latent components satisfying significance thresholds. To identify such latent components, in some cases, the disclosed systems account for a range of value types by intelligently subjecting real values to a latent-component constraint for decomposing the time series and intelligently excluding non-real values from the latent-component constraint. The disclosed systems can further identify significant anomalous data values from latent components of the metrics time series by jointly determining whether one or both of a subseries of a spike-component series and a level change from a level-component series satisfy significance thresholds.

20 Claims, 13 Drawing Sheets

(56) References Cited

OTHER PUBLICATIONS

M. Basseville and I. V. Nikiforov, Detection of Abrupt Changes: Theory and Application (Prentice Hall information and system sciences series), Prentice Hall, 4 1993.
G. E. P. Box, G. M. Jenkins, G. C. Reinsel, and G. M. Ljung, Time Series Analysis: Forecasting and Control (Wiley Series in Probability and Statistics), Wiley, 5 ed., 6 2015. [Part 1].
G. E. P. Box, G. M. Jenkins, G. C. Reinsel, and G. M. Ljung, Time Series Analysis: Forecasting and Control (Wiley Series in Probability and Statistics), Wiley, 5 ed., 6 2015. [Part 2].
G. E. P. Box, G. M. Jenkins, G. C. Reinsel, and G. M. Ljung, Time Series Analysis: Forecasting and Control (Wiley Series in Probability and Statistics), Wiley, 5 ed., 6 2015. [Part 3].
G. E. P. Box, G. M. Jenkins, G. C. Reinsel, and G. M. Ljung, Time Series Analysis: Forecasting and Control (Wiley Series in Probability and Statistics), Wiley, 5 ed., 6 2015. [Part 4].
G. E. P. Box, G. M. Jenkins, G. C. Reinsel, and G. M. Ljung, Time Series Analysis: Forecasting and Control (Wiley Series in Probability and Statistics), Wiley, 5 ed., 6 2015. [Part 5].
S. Boyd and L. Vandenberghe, Convex Optimization, Cambridge University Press, 2004.
A. M. Bruckstein, D. L. Donoho, and M. Elad, From sparse solutions of systems of equations to sparse modeling of signals and images, SIAM Review, 51 (2009), pp. 34-81.
C. Chen and L.-M. Liu, Joint estimation of model parameters and outlier effects in time series, Journal of the American Statistical Association, 88 (1993), pp. 284-297.
R. B. Cleveland, W. S. Cleveland, and I. Terpen-ning, STL: A seasonal-trend decomposition procedure based on loess, Journal of Official Statistics, 6 (1990), p. 3.
G. Davis, S. Mallat, and M. Avellaneda, Adaptive greedy approximations, Constructive Approximation, 13 (1997), pp. 57-98.
J. G. De Gooijer and R. J. Hyndman, 25 years of time series forecasting, International journal of forecasting, 22 (2006), pp. 443-473.
S. Diamond and S. Boyd, CVXPY: A Python-embedded modeling language for convex optimization, Journal of Machine Learning Research, 17 (2016), pp. 1-5.
A. Domahidi, E. Chu, and S. Boyd, ECOS: An SOCP solver for embedded systems, in 2013 European Control Conference (ECC), Jul. 2013, pp. 3071-3076.
D. L. Donoho and M. Elad, Optimally sparse representation in general (nonorthogonal) dictionaries via l1 minimization, Proc. Natl. Acad. Sci. USA, 100 (2003), pp. 2197-2202 (electronic).
M. Gupta, J. Gao, C. Aggarwal, and J. Han, Outlier Detection for Temporal Data: A Survey, IEEE Transactions on Knowledge and Data Engineering, 26 (2014), pp. 2250-2267.
F. Gustafsson, The marginalized likelihood ratio test for detecting abrupt changes, IEEE Transactions on automatic control, 41 (1996), pp. 66-78.
J. Hochenbaum, O. S. Vallis, and A. Kejariwal, Automatic anomaly detection in the cloud via statistical learning, ArXiv e-prints, abs/1704.07706 (2017).
V. Hodge and J. Austin, A survey of outlier detection methodologies, Artificial intelligence review, 22 (2004), pp. 85-126.
R. Hyndman, A. B. Koehler, J. K. Ord, and R. D. Snyder, Forecasting with Exponential Smoothing: The State Space Approach (Springer Series in Statistics), Springer, 2008 ed., 7 2008.
R. J. Hyndman and B. Billah, Unmasking the Theta method, International Journal of Forecasting, 19 (2003), pp. 287-290.
R. J. Hyndman and Y. Khandakar, Automatic time series forecasting: the forecast package for R, Journal of Statistical Software, 26 (2008), pp. 1-22.
T. W. Joo and S. B. Kim, Time series forecasting based on wavelet filtering, Expert Systems with Applications, 42 (2015), pp. 3868-3874.
N. Laptev, S. Amizadeh, and I. Flint, Generic and scalable framework for automated time-series anomaly detection, in Proceedings of the 21th ACM SIGKDD International Conference on Knowledge Discovery and Data Mining, KDD '15, New York, NY, USA, 2015, ACM, pp. 1939-1947.
A. Lavin and S. Ahmad, Evaluating Real-Time Anomaly Detection Algorithms—The Numenta Anomaly Benchmark, in Machine Learning and Applications (ICMLA), 2015 IEEE 14th International Conference on, IEEE, 2015, pp. 38-44.
S. Makridakis and M. Hibon, The M3-competition: results, conclusions and implications, International journal of forecasting, 16 (2000), pp. 451-476.
B. K. Natarajan, Sparse approximate solutions to linear systems, SIAM Journal on Computing, 24 (1995), pp. 227-234.
B. O'Donoghue, E. Chu, N. Parikh, and S. Boyd, Conic optimization via operator splitting and homogeneous self-dual embedding, Journal of Optimization Theory and Applications, 169 (2016), pp. 1042-1068.
A. V. Oppenheim and R. W. Schafer, Discrete-Time Signal Processing (3rd Edition) (Prentice-Hall Signal Processing Series), Pearson, 3 ed., 8 2009. [Part 1].
A. V. Oppenheim and R. W. Schafer, Discrete-Time Signal Processing (3rd Edition) (Prentice-Hall Signal Processing Series), Pearson, 3 ed., 8 2009. [Part 2].
A. V. Oppenheim and R. W. Schafer, Discrete-Time Signal Processing (3rd Edition) (Prentice-Hall Signal Processing Series), Pearson, 3 ed., 8 2009. [Part 3].
A. V. Oppenheim and R. W. Schafer, Discrete-Time Signal Processing (3rd Edition) (Prentice-Hall Signal Processing Series), Pearson, 3 ed., 8 2009. [Part 4].
A. V. Oppenheim and R. W. Schafer, Discrete-Time Signal Processing (3rd Edition) (Prentice-Hall Signal Processing Series), Pearson, 3 ed., 8 2009. [Part 5].
A. V. Oppenheim and R. W. Schafer, Discrete-Time Signal Processing (3rd Edition) (Prentice-Hall Signal Processing Series), Pearson, 3 ed., 8 2009. [Part 6].
A. V. Oppenheim and R. W. Schafer, Discrete-Time Signal Processing (3rd Edition) (Prentice-Hall Signal Processing Series), Pearson, 3 ed., 8 2009. [Part 7].
A. V. Oppenheim and R. W. Schafer, Discrete-Time Signal Processing (3rd Edition) (Prentice-Hall Signal Processing Series), Pearson, 3 ed., 8 2009. [Part 8].
A. V. Oppenheim and R. W. Schafer, Discrete-Time Signal Processing (3rd Edition) (Prentice-Hall Signal Processing Series), Pearson, 3 ed., 8 2009. [Part 9].
A. V. Oppenheim and R. W. Schafer, Discrete-Time Signal Processing (3rd Edition) (Prentice-Hall Signal Processing Series), Pearson, 3 ed., 8 2009. [Part 10].
A. V. Oppenheim and R. W. Schafer, Discrete-Time Signal Processing (3rd Edition) (Prentice-Hall Signal Processing Series), Pearson, 3 ed., 8 2009. [Part 11].
K. Ord, M. Hibon, and S. Makridakis, The M3-competition, International journal of forecasting, 16 (2000), pp. 433-436.
P. Perron, The great crash, the oil price shock, and the unit root hypothesis, Econometrica: Journal of the Econometric Society, (1989), pp. 1361-1401.
Further evidence on breaking trend functions in macroeconomic variables, Journal of econometrics, 80 (1997), pp. 355-385.
M. H. Pesaran, D. Pettenuzzo, and A. Timmer-mann, Forecasting time series subject to multiple structural breaks, The Review of Economic Studies, 73 (2006), pp. 1057-1084.
B. Rosner, Percentage points for a generalized esd many-outlier procedure, Technometrics, 25 (1983), pp. 165-172.
Z. R. Struzik and A. P. Siebes, Wavelet transform based multifractal formalism in outlier detection and localisation for financial time series, Physica A: Statis-tical Mechanics and its Applications, 309 (2002), pp. 388-402.
R. S. Tsay, Time series model specification in the presence of outliers, Journal of the American Statistical Association, 81 (1986), pp. 132-141.
O. Vallis, J. Hochenbaum, and A. Kejariwal, A Novel Technique for Long-term Anomaly Detection in the Cloud, in Proceedings of the 6th USENIX Conference on Hot Topics in Cloud Computing, HotCloud'14, Berkeley, CA, USA, 2014, USENIX Association, pp. 15-15.

(56) References Cited

OTHER PUBLICATIONS

Anomaly detection in R. https://github.com/ twitter/AnomalyDetection, 2015.

K. Yamanishi and J.-i. Takeuchi, A unifying frame-work for detecting outliers and change points from non-stationary time series data, in Proceedings of the eighth ACM SIGKDD international conference on Knowledge discovery and data mining, ACM, 2002, pp. 676-681.

* cited by examiner

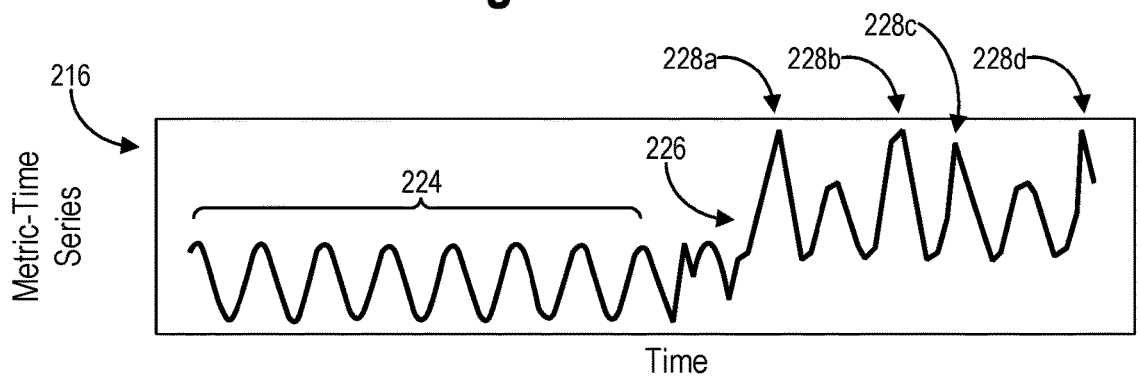
*Fig. 2A*
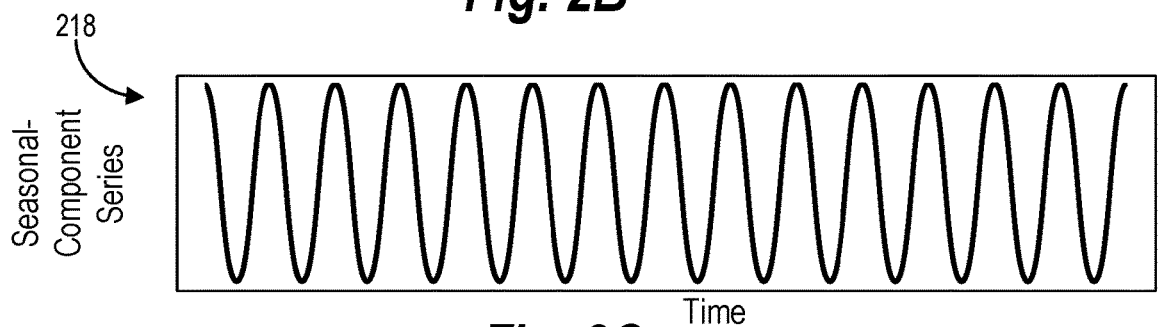
*Fig. 2B*
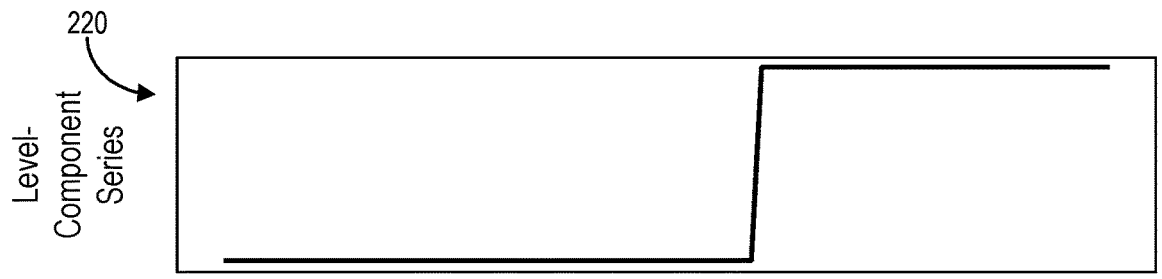
*Fig. 2C*
*Fig. 2D*

ROBUST ANOMALY AND CHANGE DETECTION UTILIZING SPARSE DECOMPOSITION

BACKGROUND

In recent years, analytics computing systems have improved the accuracy of identifying trends and seasonal changes by configuring new algorithms for analytical time series comprising datasets of metrics recorded across time. For example, conventional analytics computing systems can identify and present anomalies from time series representing user actions with respect to websites, network-accessible applications, or other network-based-device operations. To illustrate, some existing systems can separate large time series of web-metrics data into components as a basis for identifying anomalous metrics in the time series, such as abnormal user actions outside of an expected trend.

Although conventional analytics computing systems can identify anomalies in time series, such systems can inaccurately and inefficiently identify anomalous values within time series by applying conventional anomaly-detection algorithms. For instance, conventional systems sometimes inaccurately identify anomalies in time series data when the time series represents multiple seasonal trends or when the time series does not reflect a change in data levels. Specifically, while some existing systems analyze latent-component series from a time series to identify anomalous data spikes and level changes, these existing systems often require significant user input. For example, some existing analytics computing systems require users to input seasonal frequency and a maximum number of anomalies as a basis for identifying anomalies within time series. Even with such user input, however, existing analytics computing systems continue to imprecisely identify data spikes and level changes as false-positives in terms of anomalies within the time series. Such systems can misidentify data spikes and level changes by, for example, uniformly applying anomaly-detection algorithms to all values within a time series, even when some of those values may be certain non-real values (e.g., missing values, non-available values, values that are not a number, infinity values), or other values that distort correctly identifying data trends.

To illustrate, some analytics computing systems can inaccurately identify anomalous metrics from a time series by failing to account for missing or non-real values. In some cases, for instance, a time series may include both real values and non-real values. By executing an algorithm that applies uniformly to missing values, real values, non-real values, or the like, conventional systems often flag spikes or dips and level changes as anomalies from a time series when those anomalous values reflect an idiosyncratic application of an algorithm to missing values or non-real rather than anomalous values.

By applying anomaly detection techniques and protocols to values that likely ensure inaccurate outcomes, conventional analytics computing systems inefficiently utilize computing resources. For example, as just discussed, conventional systems generally analyze entire latent-component series of the entire time series—often including non-real and/or insignificant values—to identify various anomalies. But by analyzing potentially unnecessary values of an entire latent-component series, conventional systems waste computing resources to identify anomalies that are potentially erroneous and/or insignificant.

In addition to such inaccuracies and inefficiencies, conventional analytics computing systems inefficiently separate a dataset into training series and testing series to train and test anomaly-detection algorithms on the dataset. For example, conventional systems often split a time series into (i) data corresponding to a training period to tune an anomaly-detection algorithm and (ii) data corresponding to a testing period to identify anomalies for that testing period. When the training period of the time series does not accurately represent the testing period of the time series—due to seasonal data, special events, or other occurrences—such conventional systems may fail to identify anomalies by separating the data into periods.

Independent of inefficiently separating datasets, some conventional analytics computing systems rigidly apply anomaly-detection algorithms. For example, as just mentioned, some conventional systems apply an anomaly-detection algorithm to a time series regardless of variation for the type or value of underlying data in the time series. By ignoring variations in data type or value, some conventional systems can misidentify different seasonal variations, zero values, or non-real numbers as indicating an anomalous value. Further, as indicated above, some conventional systems can only identify anomalies in the testing period of a time series dataset after training an anomaly-detection algorithm on the training period of the time series dataset. But this rigid reliance on testing and training periods for data within a time series neglects important variations in the time series that can lead to critical analytical insights.

These along with additional problems and issues exist with regard to conventional systems.

BRIEF SUMMARY

This disclosure describes one or more embodiments of systems, non-transitory computer-readable media, and methods that solve the foregoing or other problems or provide other benefits. In particular, the disclosed systems determine latent components of a metrics time series and identify anomalous data within the metrics time series based on one or both of spikes/dips and level changes from the latent components satisfying significance thresholds. To identify such latent components, in some cases, the disclosed systems account for a range of value types by intelligently subjecting real values to a latent-component constraint for decomposing the time series and intelligently excluding non-real values from the latent-component constraint. The disclosed systems can further identify significant anomalous data values from latent components of the metrics time series by jointly determining whether one or both of a subseries of a spike-component series and a level change from a level-component series satisfy significance thresholds. In some cases, the disclosed systems can further modify a metrics time series and its latent components to improve anomaly detection by accounting for other time-based-data fluctuations or data types, including data in the time series reflecting a special day or time effects, leading or trailing zeros, and low-event counts. In further embodiments, the disclosed systems can impute missing data values from a metrics time series by accounting, for instance, for complex seasonality patterns or changes in level.

BRIEF DESCRIPTION OF THE DRAWINGS

The detailed description provides one or more embodiments with additional specificity and detail through the use of the accompanying drawings, as briefly described below.

FIGS. 2A-2F illustrate an example metrics time series and associated component series in accordance with one or more embodiments.

DETAILED DESCRIPTION

Figure 1:
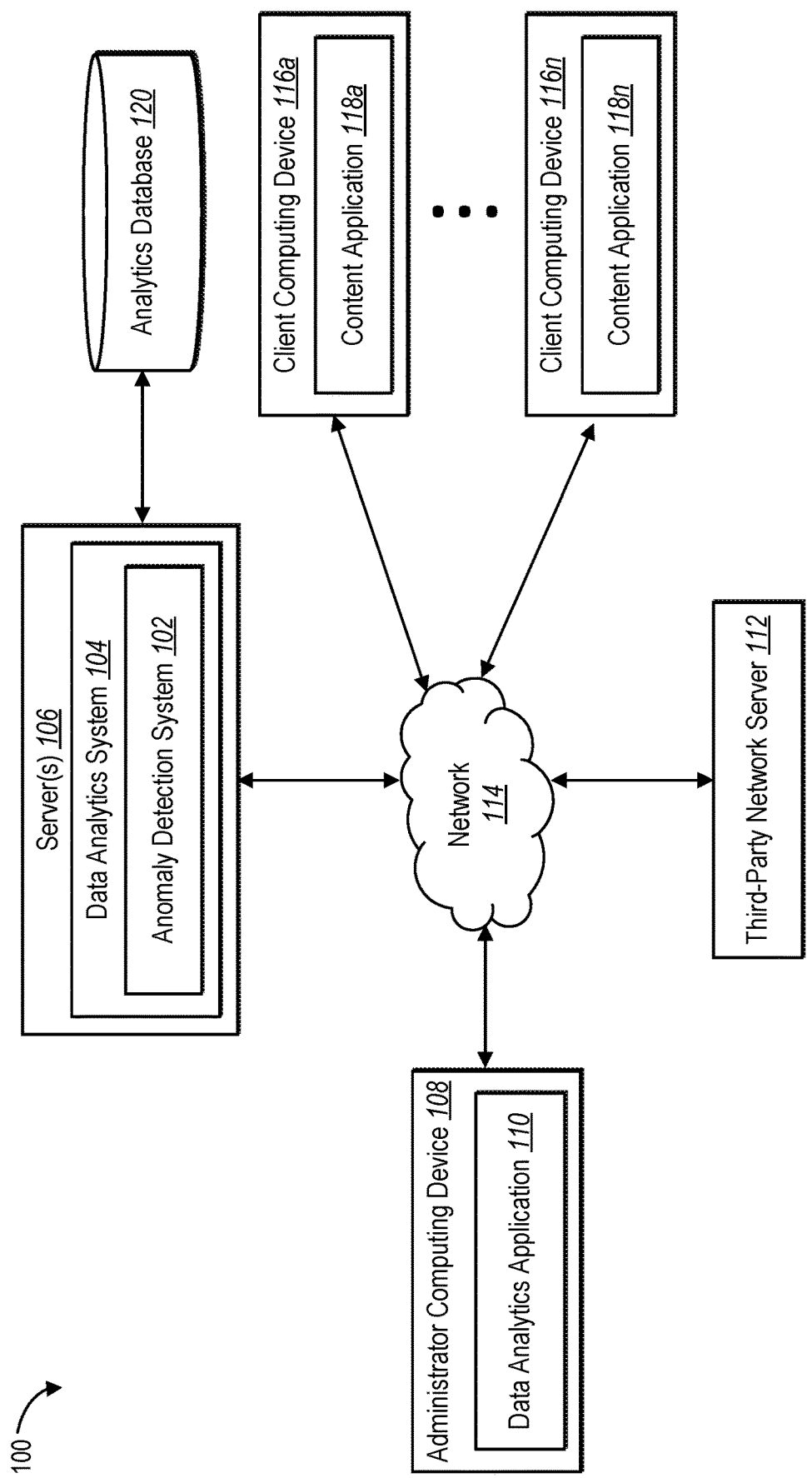
FIG. 1 illustrates an example environment in which an anomaly detection system can operate in accordance with one or more embodiments.

This disclosure describes one or more embodiments of an anomaly detection system that decomposes a metrics time series into latent components and determines one or both of spikes and level changes from the latent components indicating anomalous data values based on significance thresholds. Such latent components may include at least a spike-component series and a level-component series. As part of decomposing a metrics time series, the anomaly detection system can account for a range of value types by (i) intelligently subjecting real values from the metrics time series to a latent-component constraint defining relationships among the metrics time series and latent components and (ii) intelligently excluding non-real values from the latent-component constraint.

The anomaly detection system can further jointly determine whether one or both of a subseries of a spike-component series and a level change from a level-component series satisfy significance thresholds as a basis for identifying anomalous data values. In one or more embodiments, the anomaly detection system modifies values of the metrics time series and its latent components to avoid pitfalls common to anomaly detection by accounting for special day or time effects, leading or trailing zeros, or low-event counts. By identifying significant anomalous values from latent components of a metrics time series and performing other operations described herein, the anomaly detection system improves the accuracy, efficiency, and flexibility of conventional anomaly detection. In further embodiments, the disclosed systems can impute missing data values from a metrics time series by accounting, for instance, for complex seasonality patterns or changes in level.

To further illustrate, in some cases, the anomaly detection system can retrieve or access a metrics time series comprising metric data values representing user actions within a digital network corresponding to a time period (e.g., data for user actions with respect to a website or other network platform). The anomaly detection system further determines one or more latent components of the metrics time series, such as a spike-component series and a level-component series. The anomaly detection system can further determine whether a subseries of the spike-component series satisfies a spike-significance threshold and a level change corresponding to the level-component series satisfies a level-change-significance threshold. Based on one or both of the subseries satisfying the spike-significance threshold and the level change satisfying the level-change-significance threshold, the anomaly detection system can further generate anomalous data value for display on a client computing device.

In one or more embodiments, the anomaly detection system can determine at least a spike-component series and a level-component series as latent components of a retrieved metrics time series. For example, the anomaly detection system can determine latent components of the metrics time series by applying an optimization algorithm to the metrics time series. In one or more embodiments, the optimization algorithm is configured to determine latent components that, when combined, form the metrics time series. For instance, when executed, the optimization algorithm iteratively minimizes an objective function that decomposes the metrics time series into different latent-component series representing spikes, level changes, seasonal trends, and errors.

In some cases, the optimization algorithm is subject to a latent-component constraint indicating a number, type, and additive quality of latent components associated with the metrics time series, such as by constraining the metrics time series to equal different latent-component series. Based on this optimization algorithm and latent-component constraint, the anomaly detection system can identify at least a spike-component series and a level-component series. In additional embodiments, the anomaly detection system can further apply the optimization algorithm to identify a seasonal-component series and an error-component series as latent components of the metrics time series based on the latent-component constraint.

As indicated above, the anomaly detection system can further configure the latent-component constraint of the metrics time series to apply to real values and exclude non-real values. To illustrate, the metrics time series may include any number of real values. Additionally, the same metrics time series may include any number of non-real values, such as non-available values (e.g., "NA" or "not available"), non-number values (e.g., "NaN" or "not a number" such as zero divided by zero), and infinity values (e.g., "INF" or "infinity"). In at least one embodiment, the anomaly detection system can configure the latent-component constraint of the optimization algorithm to intelligently exclude non-real values. In such cases, the latent-component constraint need only be satisfied for real values while decomposing the metrics time series into one or more latent components.

As further indicated above, the anomaly detection system can identify significant values of the latent components of the metrics time series. For example, the anomaly detection system can concurrently identify significant spikes and dips from a spike-component series and level changes from a level-component series. In one or more embodiments, the anomaly detection system can identify significant anomalous values of the spike-component series by determining whether a subseries of the spike-component series satisfies a spike-significance threshold. Similarly, the anomaly detection system can identify significant anomalous values of the level-component series by determining whether a level change corresponding to the level-component series satisfies a level-change-significance threshold.

In one or more embodiments, the anomaly detection system can determine whether values of latent components satisfy relative significance thresholds. For example, the anomaly detection system can determine that a subseries of the spike-component series satisfies the spike-significance threshold by (i) generating a stationary time series equaling a combination of the spike-component series and residual error and (ii) determining whether data values of the stationary time series deviate from a dataset following a normalized distribution. As explained further below, in some embodiments, the stationary time series ($y_s$) equals the spike-component series (d) plus the residual error value ($\mu$). The anomaly detection system can also determine that a level change corresponding to the level-component series satisfies the level-change-significance threshold by (i) generating a significant-level-change value and (ii) determining that an absolute value of the level change corresponding to the level-component series exceeds or equals the significant-level-change value.

Additionally, the anomaly detection system can further pre-process or filter data from the metrics time series or its latent components to increase accuracy of anomaly detection. For example, the metrics time series and the associated latent components may include values that cause a system to falsely detect (or fail to detect) anomalies. To illustrate, a metrics time series may include regularly repeating spike or dip values that are expected (e.g., as with a special day that repeats every year such as a holiday) and/or groups of zeros (e.g., as with leading or tailing zeros). In one or more embodiments, the anomaly detection system can identify and ignores regularly repeating spike or dip values or removes groups of zeroes within the metrics time series or its latent components in conjunction with applying an optimization algorithm to increase accuracy of anomaly detection relative to the metrics time series.

Furthermore, the anomaly detection system can also modify one or more constraints of an optimization algorithm to more accurately identify latent components of the metrics time series, even when a metrics time series has a small number of values. For example, a metrics time series may include a number of values that corresponds to a number of events relative to a particular application or a website. In some embodiments, the number of events may be less than a threshold number (e.g., fifteen events). In response to determining that the number of values in the metrics time series is less than the threshold number, the anomaly detection system can adjust or trim the confidence interval of the expected time series derived from the given metrics time series. By adjusting or trimming a confidence interval, the disclosed anomaly detection system can effectively reduce the number of false anomalies detected within the metrics time series.

In some cases, the anomaly detection system performs these and other operations without separating data from a metrics time series into training and testing periods. For example, conventional analytics computing systems generally use a first portion of a metrics time series to train an anomaly-detection algorithm and a second portion of the metrics time series to test the same anomaly-detection algorithm. This approach is problematic because it assumes correlations between the first and second portions of the metrics time series. The present anomaly detection system avoids this approach by incorporating the full metrics time series into identification of significant anomalous values of latent components without separating the metrics time series into data values for a training period and data values for a testing period—thus, leveraging the full spectrum of data available within the metrics time series.

As mentioned above, the anomaly detection system provides many advantages and benefits over conventional systems and methods. For example, the anomaly detection system improves the accuracy with which analytics computing systems detect significant anomalous data values based on latent components of a metrics time series. By decomposing a metrics time series into latent-component series, some existing systems lack adequate algorithms or reference points to determine a latent-component series and identify statistically significant anomalous data value. Because latent-component series often lack existing thresholds for statistical significance, some anomaly-detection algorithms can misidentify anomalous data values without such thresholds for a spike-component series or a seasonal-component series—particularly when processed at the same time.

Rather than misidentify such anomalies, in some cases, the anomaly detection system can determine statistically significant anomalous values from latent-component series using novel applications of significance thresholds. For instance, in some cases, the anomaly detection system determines whether a stationary time series (equaling a combination of a spike-component series and a residual error value) deviates from a dataset following a distribution (e.g., a dataset for an analogous time series following a normalized distribution). As explained further below, in some embodiments, the stationary time series ($y_s$) equals the spike-component series (d) plus the residual error value ($\mu$). Concurrently or independently, the anomaly detection system determines whether a level change corresponding to a level-component series deviates from a significant-level-change value according to a level-change-significance threshold. As explained further below, in some embodiments, the significant-level-change value represents a critical value of a Gaussian distribution at a given significance level ($t\alpha/2$) multiplied by a significant error calculation for a residual error value ($SE(\mu)$). By using such significance thresholds, the anomaly detection system generates anomaly data that avoids pitfalls associated with conventional systems, such as identifying false anomalies or missing significant anomalies.

Independent of identifying statistically significant spikes, significant dips, or significant level changes, the anomaly detection system can intelligently apply an optimization algorithm to a metrics time series comprising both real values and certain non-real values. As indicated above, in some cases, the anomaly detection system subjects an optimization algorithm to a latent-component constraint for decomposing a metrics time series into latent components that sum to the time series. The anomaly detection system avoids misidentifying anomalies from non-real values by intelligently subjecting real values to the latent-component constraint and intelligently excluding non-real values from the latent-component constraint. In contrast to conventional systems that decompose a metrics time series including non-real values into strict constituent latent components, the anomaly detection system selectively applies a latent-component constraint to real values of a metrics time series. By autonomously decomposing a metrics times series into latent components and identifying significant anomalies from such latent components, the anomaly detection system avoids the user inputs that can lead a conventional system to misidentify anomalies.

As indicated above, in some embodiments, the anomaly detection system improves the accuracy and efficiency of existing anomaly-detection algorithms by avoiding the training and testing periods utilized by conventional analytics computing systems. Rather than relying on a first portion of a metrics time series that may inaccurately inform analysis of a second portion of the metrics time series, the anomaly detection system concurrently analyzes the full metrics time series without any specific training period. For example, as discussed below, the anomaly detection system executes an optimization algorithm that iteratively minimizes an objective function to identify latent components of a time series. In some embodiments, the anomaly detection system forgoes the need to train and test the optimization algorithm because the optimization algorithm builds in the residual error into the iterative minimization of the objective function. By avoiding any reliance on potentially uncorrelated training data, the anomaly detection system also avoids wasting computing resources on training a system to inaccurately generate anomaly data.

By avoiding these testing and training periods, the anomaly detection system is more flexible in its analysis approach. For example, as just mentioned, in some case, the anomaly detection system does not split a metrics time series into data values for a training period and data values for a testing period to generate anomaly data. Thus, by untethering itself from this possibly irrelevant training data, the anomaly detection system utilizes a more robust approach than those exhibited by conventional systems.

In addition to the improved efficiency and accuracy described above, in some embodiments, the disclosed anomaly detection system can infer missing values by imputing values based on past and future data—while accounting for complex seasonality patterns and changes in level. Conventional anomaly-detection algorithms cannot interpolate or extrapolate such missing values as described herein and cannot correctly identify significant anomalies in metrics time series by imputing missing values.

For example, a metrics time series may be missing values or other data as part of a weekly, monthly, or other seasonal pattern (e.g., weekly spike or dip). If a number of visitors on a webpage (or users of an application) typically increases every other week on Mondays—because of a biweekly special offer—a metrics time series may be missing increases for one such Monday due to a data loss or other interfering event. Conventional systems or conventional anomaly-detection algorithms incorrectly account (or fail to account) for such missing values as part of a weekly or other seasonal pattern by either utilizing values just before or after the missing value or utilizing values from a previous week to impute the missing values. By contrast, the disclosed anomaly detection system can correctly infer missing values from past or future data. When missing values are part of a biweekly pattern, for instance, the disclosed anomaly detection system can recognize such a biweekly pattern and account for values two weeks ago or two weeks in the future to impute the missing values.

As illustrated by the foregoing discussion, the present disclosure utilizes a variety of terms to describe features and advantages of the anomaly detection system. Additional detail is now provided regarding the meaning of such terms. For example, as used herein, the term "metrics time series" refers to a collection of data indexed over time. In particular, metrics time series can include a collection of data representative of users and/or user actions relative to a particular application or website occurring at various times during a particular time period. To illustrate, a metrics time series can include a number of hyperlink clicks within a particular web page every day for a year. In one or more embodiments, a metrics time series includes the values for each data point collected within the stated time period. Thus, a metrics time series for daily hyperlink clicks over a year might have 365 values, where each value represents a number of hyperlink clicks for the associated day.

In one or more embodiments, the anomaly detection system can decompose a metrics time series into one or more latent components or latent-component series. As used herein, the terms "latent component" and "latent-component series" refer to a component of a time series or other dataset that contributes to observed values in the metrics time series. For example, the anomaly detection system can decompose a metrics time series into one or more of a level-component series, a spike-component series, a seasonal-component series, and an error-component series. Each latent-component series can represent a different contribution to the metrics time series. Accordingly, data in a latent component of a time series may not be directly observable.

As used herein, the term "level-component series" refers to a latent component of a metrics time series that has values that exhibit an increase or decrease in an average value of the metrics time series, such as a piecewise increase in average value. For example, a value in a level-component series may include or be representative of a level change. As used herein, a "level change" refers to an increase or decrease in an average value of a metrics time series, such as a piecewise increase in average value across a series of data points. To illustrate, in a metrics time series that includes a single level change (e.g., the average of the values of the metrics time series demonstrates a single piecewise increase), the corresponding level-component series may include two values—the average value of the metrics time series prior to the average increase and the average value of the metrics time series after the average increase.

As used herein, the term "spike-component series" refers to a latent component of a metrics time series that has values exhibiting spontaneous, anomalous, or other non-seasonal increases or decreases. For example, every "spike" or abnormal increase in a spike-component series can correspond to a value of the associated metrics time series that is a spontaneous, anomalous, or other non-seasonal increase in comparison to the other values in the metrics time series.

As used herein, the term "seasonal-component series" refers to a latent component of a metrics time series that has values that fluctuate in a manner correlated with periods of time. For example, the values of a seasonal-component series may fluctuate by the day, by the week, by the month, by the year, by the season (e.g., spring, summer, fall, winter), and/or by benchmark dates (e.g., according to widely recognized holidays, such as the six weeks leading up to Christmas).

As used herein, the term "error-component series" refers to statistical noise, variance, or other residual latent components other than explainable latent components (e.g., level, seasonal, seasonal latent components). For example, an error-component series may include remainder values that, when combined with the values of other latent-component series, result in the original metrics time series.

In one or more embodiments, the anomaly detection system can concurrently determine significant values of latent components of a metrics time series based on significance thresholds. As used herein, the term "significance threshold" refers to a predetermined threshold relative to a latent component or portion of a latent component, above or below which represents a significant value. A portion of a latent component may be part of an indirect use of a significance threshold. For example, the anomaly detection system can identify a value in a spike-component series as significant if a stationary time series corresponding to the spike-component series deviates from a dataset following a normalized distribution.

As used herein, the term "anomalous data value" refers to an outlier or group of outliers in a dataset. For example, an anomalous data value can be a data value that abnormally differs from an expected value for a given time. To illustrate, an anomalous data value may represent an outlier data value in a metrics time series that has a statistically significant difference from the expected value. Rather than identifying all potential anomalies relative to a metrics time series, the anomaly detection system identifies significant anomalies based on one or more latent components of a metrics time series.

As used herein, a "significant anomaly" refers to an identified anomaly that is statistically significant relative to other identified anomalies or data values. For example, a significant anomaly can include an identified anomaly from a metrics time series with a small p-value or probability value indicating evidence against the null hypothesis (e.g., indicating a high likelihood that the identified anomaly is significant).

Additional detail regarding the anomaly detection system will now be provided with reference to the figures. For example, FIG. 1 illustrates a schematic diagram of an example system environment 100 (e.g., the "environment" 100) for implementing an anomaly detection system 102 in accordance with one or more embodiments. Thereafter, a more detailed description of the components and processes of the anomaly detection system 102 is provided in relation to the subsequent figures.

As shown in FIG. 1, the environment 100 includes server(s) 106, an administrator computing device 108, a third-party network server 112, client computing devices 116a-116n, and a network 114. Each of the components of the environment 100 can communicate via the network 114, and the network 114 may be any suitable network over which computing devices can communicate. Example networks are discussed in more detail below in relation to FIG. 9.

As mentioned, the environment 100 includes the administrator computing device 108 and the client computing devices 116a-116n. The administrator computing device 108 and the client computing devices 116a-116n can be one of a variety of computing devices, including a smartphone, tablet, smart television, desktop computer, laptop computer, virtual reality device, augmented reality device, or other computing device as described in relation to FIG. 9. In some embodiments, the environment 100 can include any number or arrangement of client computing devices, each associated with a different user. The administrator computing device 108 and the client computing devices 116a-116n can further communicate with the server(s) 106 and/or the third-party network server 112 via the network 114. For example, the client computing devices 116a-116n can communicate via the network 114 with the third-party network server 112 to view and interact with one or more web sites hosted by the third-party network server 112. The third-party network server 112 can provide user-interaction data associated with the one or more websites for anomaly analysis to the server(s) 106 via the network 114. The administrator computing device 108 can receive anomaly data for display from the server(s) 106 via the network 114.

In one or more embodiments, the administrator computing device 108 includes a data analytics application 110. For example, a user of the administrator computing device 108 can query metrics time series data and analyze such data by interacting with the data analytics application 110. When executing the data analytics application 110, the administrator computing device 108 can communicate with the data analytics system 104 to receive and display metric time series data, latent component data, and anomaly data. Additionally, the client computing devices 116a-116n can respectively include content applications 118a-118n. For example, the content application 118a can be an application for accessing and interacting with digital content, such as a web browser application, a social networking application, a file server application, and so forth.

As further illustrated in FIG. 1, the environment 100 includes the server(s) 106. The server(s) 106 may include one or more individual servers that may generate, store, receive, and transmit electronic data. For example, the server(s) 106 may receive data from the client computing device 116a in the form of a user input, such as a keystroke stream. In addition, the server(s) 106 can transmit data to the administrator computing device 108.

As further shown in FIG. 1, the server(s) 106 can also include the anomaly detection system 102 as part of a data analytics system 104. The data analytics system 104 can communicate with one or more of the third-party network server 112 and the administrator computing device 108 to receive, generate, modify, analyze, store, and transmit digital content. For example, the data analytics system 104 can communicate with the third-party network server 112 to assemble and analyze metric time series associated with user interactions with an application or a website hosted by the third-party network server 112. Additionally, the anomaly detection system 102 and the data analytics system 104 can store and retrieve analytics information in the analytics database 120. For example, the analytics database 120 can store metrics time series data, latent component data, and anomaly data.

Although FIG. 1 depicts the anomaly detection system 102 located on the server(s) 106, in some embodiments, the anomaly detection system 102 may be implemented by (e.g., located entirely or in part) on one or more other components of the environment 100. For example, the anomaly detection system 102 may be implemented in whole or in part by the administrator computing device 108.

In one or more embodiments, the third-party network server 112 is at least one of an application server, a communication server, a web-hosting server, a social networking server, or a digital content analytics server. For example, the third-party network server 112 can receive user-interaction data from one or more of the client computing devices 116a-116n associated with user-interactions with network content (e.g., hyperlink clicks, page lands, video completes). The third-party network server 112 can also receive user information associated with users of the client computing devices 116a-116n. For example, the third-party network server 112 can receive user demographic information, user account information, and user profile information. In at least one embodiment, the third-party network server 112 can include multiple servers.

Figure 2E:
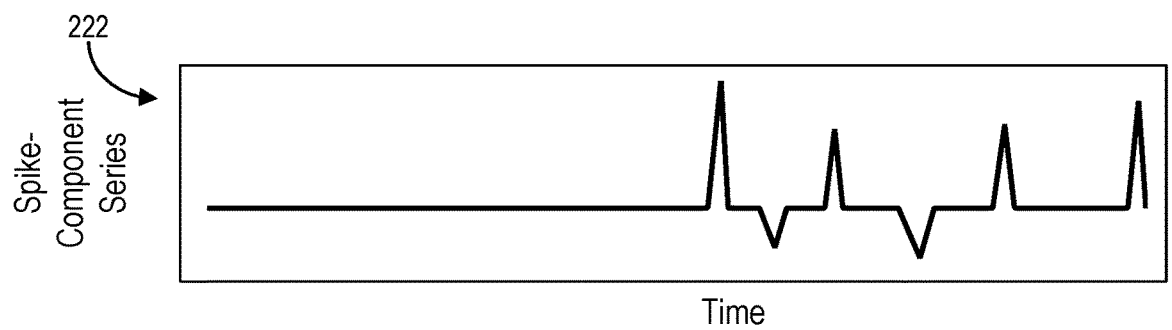
Figure 2F:
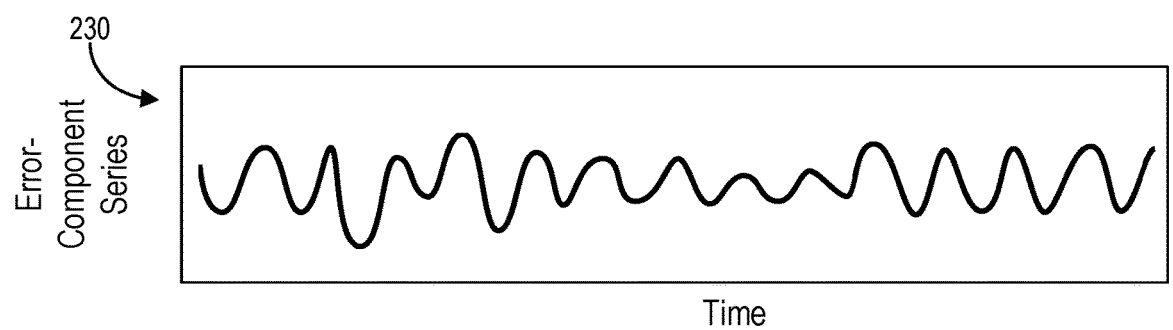

FIGS. 2A-2E illustrate examples of a metrics time series and associated latent components. For example, FIG. 2A shows a metrics time series 202. In one or more embodiments, the metrics time series 202 includes real values and non-real values, as well as other portions of problematic indices. To illustrate, the metrics time series 202 includes real values in the real-valued portions 206a, 206b, and 206c. In at least one embodiment, the real-valued portions 206a-206c include values that can be integers or decimal numbers.

As further shown in FIG. 2A, the metrics time series 202 also includes non-real values in other portions. For example, in the "not available" portion 208, the metrics time series 202 includes a non-available value. In one or more embodiments, the data analytics system 104 may receive an indicator that a numerical value associated with a particular index or position within the metrics time series 202 is not available. The value may not be available for various reasons, such as data corruption or network connectivity problems during the associated time period.

Additionally, as shown in FIG. 2A, the metrics time series 202 includes a non-number portion 210 and an infinity-value portion 212. For example, the non-number portion 210 can include one or more non-number values associated with "0/0" or "NaN" (e.g., "not a number"). Similarly, the infinity-value portion 212 can include one or more infinity values associated with "INF" (e.g., "infinity"). In one or more embodiments, the data analytics system 104 may receive an indicator that a value associated with a particular index or position within the metrics time series 202 is not a number or an infinity value. Because the data analytics system 104 cannot accurately represent these types of inputs within the metrics time series 202, the data analytics system 104 can populate these values with "NaN," "0/0," or "INF." The data analytics system 104 can use any suitable alternative values or characters to represent non-real values.

In one or more embodiments, the data analytics system 104 can represent a metrics time series as a trend over time. For example, as shown in FIG. 2B, the data analytics system 104 can generate metric-time series 216 representing a particular metrics time series. In one or more embodiments, the data analytics system 104 can generate the metric-time series 216 by plotting a point in the metric-time series 216 for each value in the associated metrics time series, where the x-value of the point is the date and/or time associated with the value and the y-value of the point is the value.

As mentioned above, and as discussed below, the anomaly detection system 102 can decompose a metrics time series into one or more latent-component series. In one or more embodiments, the anomaly detection system 102 can further generate trends associated with each latent-component series. For example, the anomaly detection system 102 can decompose a metrics time series into a seasonal-component series, a level-component series, a spike-component series and an error-component series. As shown in FIGS. 2C, 2D, 2E, and 2F, respectively, the anomaly detection system 102 can generate a seasonal-component series 218, a level-component series 220, and a spike-component series 222, and an error-component series 230.

For example, as shown in FIG. 2C, the seasonal-component series 218 can include periodically varying values that contribute to one or more index values in the corresponding metrics time series. For instance, the seasonal-component series 218 may be representative of a region 224 of the metric-time series 216 that has a waveform similar in shape to the seasonal-component series 218. As further shown in FIG. 2D, the level-component series 220 can include a piecewise increase in an average value of the corresponding metrics time series. For instance, the average value increase in the area 226 of the metric-time series 216 can be represented by the increase shown in the level-component series 220. As further shown in FIG. 2E, the spike-component series 222 can include non-repeating, temporary changes in metric values of the metrics time series. For instance, the spikes shown in the spike-component series 222 can be representative of the data points 228a, 228b, 228c, and 228d in the metric-time series 216. As further shown in FIG. 2F, the error-component series 230 can include statistical noise, variance, or other residual latent components other than explainable latent components, such noise or variance not represented by the seasonal, level, and spike components shown in the series 218-222 discussed above.

As discussed above, in some embodiments, the anomaly detection system 102 improves existing anomaly detection systems by subjecting an optimization algorithm to an intelligent latent-component constraint for decomposing a metrics time series into latent components that sum to the time series. For instance, in some embodiments, the anomaly detection system 102 avoids misidentifying anomalies from non-real values by intelligently subjecting real values to the latent-component constraint and intelligently excluding non-real values from the latent-component constraint. Thus, the resulting latent-component series lend themselves to much greater accuracy in significant anomaly detection. In accordance with one or more embodiments, FIG. 3 illustrates an overview of the anomaly detection system 102 determining latent components of a metrics time series and identifying significant anomalies based on the latent components.

Figure 3:
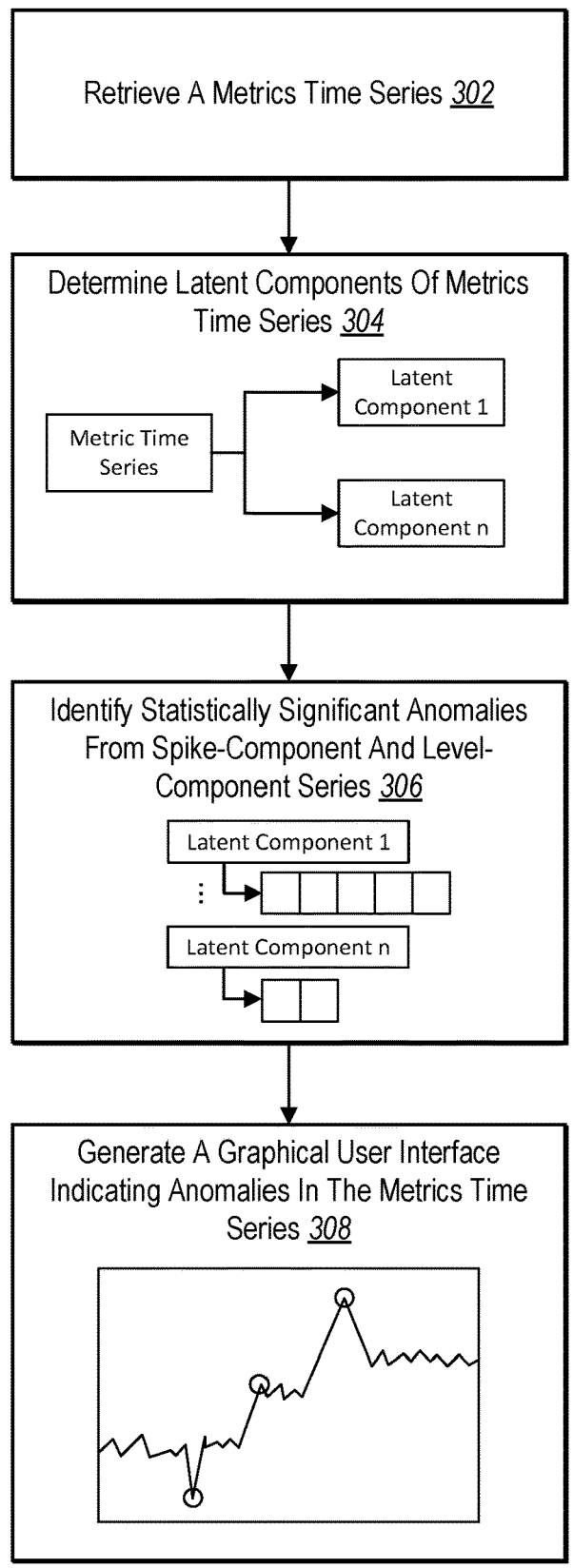
FIG. 3 illustrates an overview of an anomaly detection system determining latent components of a metrics time series and identifying significant anomalies based on the latent components in accordance with one or more embodiments.

Specifically, FIG. 3 illustrates the anomaly detection system 102 retrieving a metrics time series 302. In one or more embodiments, the anomaly detection system 102 can retrieve the metrics time series in response to receiving a query from the administrator computing device 108. For example, the anomaly detection system 102 can receive a query associated with the metrics time series from the administrator computing device 108 and identify the corresponding metrics time series from the analytics database 120 (e.g., as shown in FIG. 1). Alternatively, in response to receiving the query, the anomaly detection system 102 can request the metrics time series from the third-party network server 112.

In one or more embodiments, the anomaly detection system 102 can further determine latent components of a metrics time series 304. For example, the anomaly detection system 102 can determine at least a level-component series and a spike-component series as latent components of the metrics time series by executing an optimization algorithm. In some cases, the anomaly detection system 102 executes the optimization algorithm subject to a latent-component constraint and excluding non-real values of the metrics time series from the latent-component constraint. To illustrate, the anomaly detection system 102 configures the optimization algorithm to exclude any non-real values (e.g., NAs, NaNs) from the latent-component constraint while decomposing the metrics time series into one or more latent components. To further ensure that INF values (e.g., infinity values) in the metrics time series are later identified as anomalies, the anomaly detection system 102 can replace the spike-component series with the metrics time series in an objective function of the optimization algorithm. With these configurations to the optimization algorithm, the anomaly detection system 102 can accurately decompose the metrics time series into at least a spike-component series and a level-component series, even if the metrics time series includes values that are representative of non-real numbers.

As further illustrated in FIG. 3, the anomaly detection system 102 can identify statistically significant anomalies from the spike-component series and the level-component series 306. In one or more embodiments, the anomaly detection system 102 can concurrently apply different statistical analyses to one or more latent components of the metrics time series to identify the significant values of the latent components. The anomaly detection system 102 can then utilize anomaly detection to determine if any of the significant values are also anomalous.

For example, the anomaly detection system 102 can identify a significant subseries of a spike-component series by determining whether one or more of the values in the spike-component series satisfy a spike-significance threshold. In one or more embodiments, for instance, the anomaly detection system 102 generates a stationary time series equaling a combination of the spike-component series and a residual error value. The anomaly detection system 102 further determines that a spike-component-series value satisfies the spike-significance threshold by determining that the stationary time series deviates from a dataset following a distribution e.g., a dataset for an analogous time series following a normalized distribution). In additional embodiments, the anomaly detection system 102 can utilize other statistical approaches in determining whether a subseries of the spike-component series satisfies the spike-significance threshold, thereby making the values of subseries statistically significant.

The anomaly detection system 102 can further identify a significant level change corresponding to the level-component series. For example, the anomaly detection system 102 can determine that a level change corresponding to the level-component series is significant by determining whether level change satisfies a level-change-significance threshold. In one or more embodiments, the anomaly detection system 102 can determine that the level change satisfies a level-change-significance threshold by generating a significant-level-change value and determining that an absolute value of the level change corresponding to the level-component series exceeds or equals the significant-level-change value. In such an example, the level-change-significance threshold can be based on a critical value of a Gaussian distribution at a predetermined significance level.

As further shown in FIG. 3, the anomaly detection system 102 can generate the anomaly detection algorithm results on a graphical user interface indicating anomalies in the metrics time series 308. For example, the anomaly detection system 102 can identify anomalous values representing a significant deviation from an expected trend associated with the metrics time series. In one or more embodiments, the anomaly detection system 102 can further generate the anomaly detection algorithm results on a graphical user interface for display on a client computing device (e.g., the client computing device 108a as shown in FIG. 1) that includes indications of the anomalous values in connection with the metrics time series 308 and its various latent components. For example, the anomaly detection system 102 can generate a trend of the metrics time series with indications of the spikes in the metrics time series that are anomalous. The anomaly detection system 102 can further generate the anomaly detection algorithm results on a graphical user interface to include trends associated with the latent components.

Figure 4:
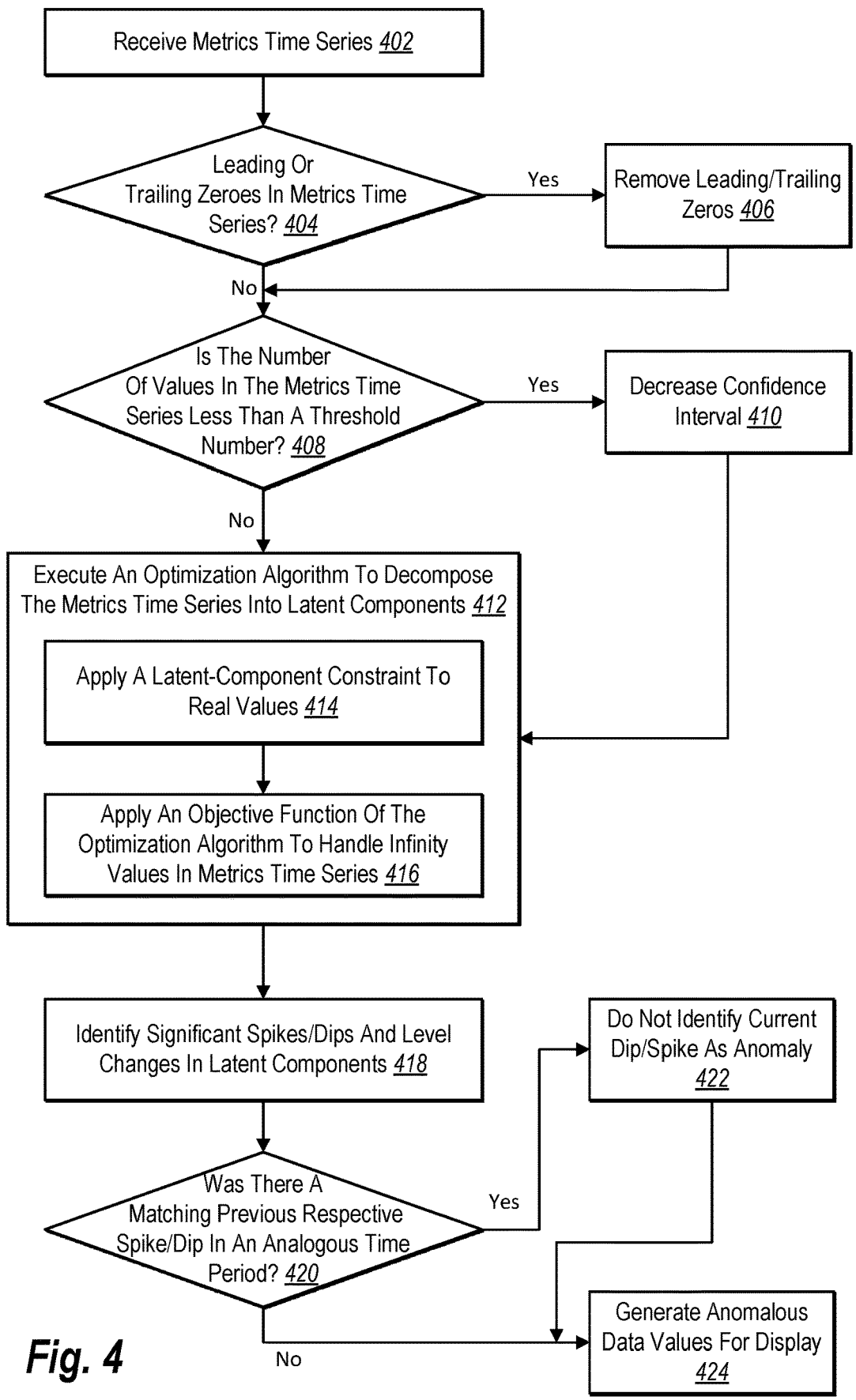
FIG. 4 illustrates a process of identifying different data types, executing an optimization algorithm to determine latent components of a metrics time series, and determining significant anomalies from the latent components of the metrics time series in accordance with one or more embodiments.

FIG. 4 illustrates additional detail with regard to the process by which the anomaly detection system 102 determines significant anomalies from latent components of a metrics time series. For example, as shown in FIG. 4, the anomaly detection system 102 can retrieve a metrics time series 402. As discussed above, the anomaly detection system 102 can retrieve the metrics time series in response to a query initiated by the administrator computing device 108. For example, the anomaly detection system 102 can receive a query from the administrator computing device 108 via the data analytics application 110 for a metrics time series associated with network user actions for a given time range. In response to receiving the query, the anomaly detection system 102 can retrieve metrics time series information corresponding to the query from the third-party network server 112. In at least one embodiment, the metrics time series information may be limited to the specified time range. In other embodiments, the metrics time series information may include data outside the specified time range, in addition to other metadata (e.g., user information, geographic information).

Prior to decomposing the metrics time series into latent components, in one or more embodiments, the anomaly detection system 102 can modify the metrics time series to improve accuracy of anomaly detection. For example, the anomaly detection system 102 can modify the metrics time series by identifying leading and/or trailing zeros in the metrics time series 404. For example, in some embodiments, a monthly metrics time series may be associated with a digital campaign associated with a particular webpage that began in the middle of the month. The metrics time series may only include non-zero values for the last half of the month, with the initial indices of the metrics time series populated by zeros because the campaign had not yet begun during the days associated with those initial indices. If included in anomaly detection, these leading zero values may cause inaccurate identification of anomalies associated with the metrics time series. Accordingly, in response to identifying leading and/or trailing zeros in the metrics time series (e.g., "Yes" in 404), the anomaly detection system 102 can remove the identified leading and/or trailing zero values from the metrics time series 406.

Moreover, the anomaly detection system 102 can improve the accuracy of the anomaly detection process by determining if the number of values in the metrics time series is less than a threshold number 408. For example, in one or more embodiments, the optimization algorithm that decomposes the metrics time series into its latent components cannot accurately identify anomalies when the number of values in the metrics time series is below a threshold number (e.g., 15 events). In at least one embodiment, in response to determining that the number of values in the metrics time series is equal to or less than the threshold number and that each value in the metrics time series is non-negative (e.g., "Yes" in 408), the anomaly detection system 102 can trim or decrease a confidence interval for an error constraint of the optimization algorithm 410. For example, as will be discussed further below, for the error constraint: $\|e\|_2 \le \rho$, the anomaly detection system 102 can decrease the parameter p. In at least one embodiment, the practical effect of decreasing the parameter p is to reduce the potential number of anomalies detected from the metrics time series.

To decompose the metrics time series into one or more latent components, the anomaly detection system 102 can execute an optimization algorithm subject to a latent-component constraint. For example, as part of this execution, the anomaly detection system 102 can apply a latent-component constraint to values and can apply an objective function as part of the optimization algorithm.

For example, an analytics system can configure the following optimization algorithm (1):

$$\min_{(s,t,d,e)} \|Fs\|_1 + w_1\|\Delta t\|_1 + w_2\|d\|_1$$

Subject to $y = s + t + d + e$ $$\|e\|_2 \le \rho \quad (1)$$

As shown above, the objective function is: $\min_{(s,t,d,e)} \|Fs\|_1 + w_1\|\Delta t\|_1 + w_2\|d\|_1$. The strict latent-component constraint is: Subject to $y=s+t+d+e$. The error constraint is: $\|e\|_2 \le \rho$. Here, s is the seasonal-component series, t is the level-component series, d is the spike-component series, e is the residual error-component series and the metrics time series y and the corresponding latent-component series include metrics values (e.g., observations) over a finite sized fixed window of size N (i.e., y, s, t, d, $e \in \mathbb{R}^N$). In the objective function above, the term F denotes an N×N discrete Fourier transform matrix or other frequency transform matrix, where F is multiplied by the seasonal-component series s. $\|Fs\|_1$ is a seasonal term computed from the seasonal-component series s. The term $\Delta: \mathbb{R}^N \to \mathbb{R}^{N-1}$ denotes the first difference operator (i.e., $k^{th}$ element of $\Delta t$ would be $(t(k+1)-t(k))$. The references to $\|\Delta t\|_1$ and $\|d\|_1$ respectively represent the $l_1$ norm of a level change and the $l_1$ norm of the spike-component series. The parameter $w_1$ represents a weight associated with the level-component series t, while the parameter $w_2$ represent a weight associated with the spike-component series d. The parameter $\rho$ represents a p-value or level of statistical significance.

The parameters $w_1$, $w_2$, and $\rho$ are parameters that can likewise be adjusted to emphasize various contributions of the latent components. In some embodiments, the weight $w_1$ models or otherwise indicates a contribution of the level-component series to the metrics time series. For example, decreasing $w_1$ indicates that the level-component series provides a larger contribution to the metrics time series. The weight $w_2$ models or otherwise indicates the contribution of the spike-component series to the metrics time series. For example, decreasing $w_2$ indicates that the spike-component series provides a larger contribution to the metrics time series.

As set forth above, the optimization algorithm (1) minimizes the objective function subject to the latent-component constraint. Broadly, the objective function is a convex function that includes a sum of various terms representative of the latent components of the metrics time series y. Thus, over multiple iterations, the optimization algorithm (1) minimizes the objective function such that all values of the resulting latent components satisfy the latent-component constraint. If a value is missing from the metrics time series y in a particular iteration, according to the objective function, the optimization algorithm (1) selects a substitute value from Fs.

Accordingly, the optimization algorithm (1) promotes sparsity on the different latent components of the metrics time series y using the $l_1$ norm, which is an absolute value of the relevant term. By using the $l_1$ norm of the vectors representing the various latent components, an analytics system can identify sparsely distributed values in the latent-component series. For example, the seasonal term Fs represents a frequency transformation of the seasonal-component series s. The frequency transformation transforms the seasonal-component series s from a time domain to a frequency domain. An example of Fs is a discrete Fourier transform ("DFT"). In the optimization algorithm (1), a sparse representation of the seasonal-component series s in the discrete Fourier domain or other frequency domain is encouraged by using the $l_1$ norm ($\|Fs\|_1$) of this frequency transform. By transforming the seasonal-component series s from a time domain to a frequency domain, the optimization algorithm (1) is well suited to represent periodic signals.

The optimization algorithm (1) above also uses an assumption that the level-component series t is piecewise constant. This assumption allows shifts in the average level of index values in the metrics time series to be captured more accurately in the level-component series. The piecewise constant assumption on the level-component series t balances simplicity of the model and over-fitting to the data. From a theoretical standpoint, piecewise constant functions account for all index values in the metrics time series so there is no loss of generality in this assumption. From practical considerations, slowly varying level values can be accurately represented by a sequence of infrequent level shifts or piecewise constant signals.

The assumption that the level-component series t is piecewise constant is implemented in the optimization algorithm (1) above by using the level term $\|\Delta t\|_1$, which is the $l_1$-norm of a vector populated with differences between adjacent pairs of level values in the level-component series t (i.e., $\Delta t_k = t(k+1) - t(k)$). In this example, $(t(k+1)-t(k))$ is expected to be non-zero for few values of $k \in \{0, \ldots, N-1\}$ in a slowly varying, piecewise constant level-component series t. Including the level term $\|\Delta t\|_1$ in the optimization algorithm encourages sparsity within the level-component series t.

In this example, the spikes in the spike-component series d are assumed to occur infrequently, resulting in the spike-component series d being sparse in the time domain. This assumption can be implemented by computing the spike term as an $l_1$-norm of the spike component series d.

The anomaly detection system 102 can compute the error-component series e according to the objective function by subtracting the other latent-component series s, t, and d, from the metrics time series y. The error-component series e captures noise and model fitting errors in y. The effect of the error-component series e is controlled in the optimization algorithm (1) by using the error constraint, $\|e\|_2 \le \rho$, as an upper bound on the energy of the error-component series e. To account for negative values, in some embodiments, the anomaly detection system 102 squares the error constraint as follows: $\|e\|_2^2 \le \rho^2$. Although the optimization algorithm (1) discussed above is a convex optimization problem, the anomaly detection system 102 can decompose the metrics time series y into its latent components in any suitable manner.

While the optimization algorithm (1) above decomposes the metrics time series into its latent components, the optimization algorithm (1) fails to account for non-real values of the metrics time series y. Accordingly, as shown in FIG. 4, rather than using the optimization algorithm (1), the anomaly detection system 102 executes an optimization algorithm (2) to decompose the metrics time series into latent components 412. As shown, the optimization algorithm (2) is a modification of the optimization algorithm (1) that overcomes various shortcomings. For example, during execution, the anomaly detection system 102 can apply the latent-component constraint to real values 414, as shown in FIG. 4 and in the optimization algorithm (2) below. As further shown in FIG. 4 and described further below, the anomaly detection system 102 can apply an objective function of the optimization algorithm (2) to handle infinity values in metrics time series 416.

As just noted, in one or more embodiments, the anomaly detection system 102 executes an optimization algorithm (2) to decompose the metrics time series into latent components as follows:

$$\min_{(s,t,d,e)} \|Fs\|_1 + w_1\|\Delta t\|_1 + w_2\|d\|_1$$

Subject to $y[\text{ind}] = s[\text{ind}] + t[\text{ind}] + d[\text{ind}] + e[\text{ind}]$ $$\|e\|_2 \leq \rho \quad (2)$$

As shown above, the optimization algorithm (2) uses the same objective function explained above with respect to optimization algorithm (1). In contrast to the optimization algorithm (1), the anomaly detection system 102 configures the latent-component constraint (e.g., Subject to y[ind]=s[ind]+t[ind]+d[ind]+e[ind]) for the optimization algorithm (2) such that the constraint is applied only to the real-valued indices of y. As such, the optimization algorithm (2) will choose $\Delta t = d[i] = e[i] = 0$ corresponding to the non-real values of y. The anomaly detection system 102 then calculates the seasonal-component series for non-real-valued indices of y from the frequency domain. By configuring the optimization algorithm (2) in this manner, the optimization algorithm (2), after execution, replaces non-real values with an expected value that takes into account seasonality.

By executing the optimization algorithm (2), the anomaly detection system 102 appropriately accounts for metrics time series values including non-available values and non-number values. The optimization algorithm (2), however, does not correctly account for infinity values. As such, the anomaly detection system 102 can further modify and apply the objective function of the optimization algorithm (2) to handle infinity values in the metrics time series 416. For example, the anomaly detection system 102 can allow for infinity values in the metrics time series y by replacing the spike-component series d with the metrics time series y in the objective function (e.g., $\min_{(s,t,d,e)} \|Fs\|_1 + w_1\|\Delta t\|_1 + w_2\|d\|_1$) of the optimization algorithm (2) above. Thus, the objective function becomes: $\min_{(s,t,d,e)} \|Fs\|_1 + w_1\|\Delta t\|_1 + w_2\|y\|_1$. In at least one embodiment, this reconfiguration ensures that infinity values in the metrics time series are replaced with real numbers that are large enough to ensure identification as significant anomalous spikes.

In one or more embodiments, the anomaly detection system 102 can execute the optimization algorithm (2) by constraining the metrics time series to comprise a sum of latent components. As discussed above, the latent-component constraint of the optimization algorithm (e.g., Subject to y[ind]=s[ind]+t[ind]+d[ind]+e[ind]) specifies that the metrics time series is a sum of various latent components. Here, the metrics time series is a sum of the seasonal-component series, the level-component series, the spike-component series, and the error-component series. In at least one embodiment, the anomaly detection system 102 can utilize the resulting error-component series e to generate upper and lower bounds for corresponding indices in the other latent-component series to identify anomalous data (e.g., index values that are outside the generated bounds).

By executing the optimization algorithm (2) subject to the latent-component constraint, the anomaly detection system 102 can decompose the metrics time series y into the latent-component series s, t, d, and e. In additional or alternative embodiments, the anomaly detection system 102 can execute an optimization algorithm to identify fewer or additional latent-component series of the metrics time series y. Additional information with regard to how the anomaly detection system 102 detects anomalies in latent components of the metrics time series is described by Shiv Kumar Saini, Sunav Choudhary & Gaurush Hiranandani, Extracting Seasonal, Level, and Spike Components from a Time Series of Metrics Data, U.S. patent application Ser. No. 15/804,012 (filed Nov. 6, 2017), the entire contents of which are hereby incorporated by reference.

Having identified the latent-component series of the metrics time series, the anomaly detection system 102 can identify significant anomalous data values based on the latent-component series. As shown in FIG. 4, for example, the anomaly detection system 102 can identify significant spikes/dips and level changes in latent components 418. As discussed above, in some embodiments, the anomaly detection system 102 improves on conventional systems by detecting anomalous data values from one or more latent components of the metrics time series and determining whether the identified anomalies differ from a threshold or expected value to a statistically significant degree.

In one or more embodiments, the anomaly detection system 102 identifies significant anomalous data values of the latent-component series (e.g., as in the act 418) based on significance thresholds. For example, the anomaly detection system 102 can identify significant anomalous data values of a spike-component series by determining whether a sub-series of the spike-component series satisfies a spike-significance threshold. In at least one embodiment, the anomaly detection system 102 generates a stationary time series equaling a combination of the spike-component series and a residual error value. The anomaly detection system 102 then further determines that a spike-component series value satisfies the spike-significance threshold by determining that the value deviates from a dataset following a normalized distribution.

To illustrate, in one or more embodiments and to identify statistically significant spikes in the spike-component series d, the anomaly detection system 102 first removes any serial correlation from the error within the metrics time series. For instance, let $e_t = \alpha_0 + \alpha_1 * e_{t-1} + \mu_t$, where $e_t$ represents the error within the metrics time series. This AR1 regression on the estimated error removes serial correlation from the error. The anomaly detection system 102 can add the residual error value $\mu$ to the spike-component series d to get a stationary time series: $y_s = d + \mu$. This stationary time series $y_s$ is free from seasonality and level changes, and d and $\mu$ are serially uncorrelated. Thus, the stationary time series $y_s$ is suitable for further statistical analysis because any small spikes introduced by the error $e_t$ are removed or otherwise accounted for.

In at least one embodiment, the anomaly detection system 102 identifies the significant spikes and dips in the stationary time series $y_s$ utilizing the Generalized Extreme Studentized Distribution ("GESD") test. For example, the GESD test detects one or more outliers in a univariate dataset that follows an approximately normal distribution. The anomaly detection system 102 can increase the accuracy of the GESD test by utilizing the number of values in the spike-component series as the maximum number of potential outliers required by the GESD test. Thus, the anomaly detection system 102 can identify the outliers detected by the GESD test as significant spikes (e.g., significant values) in the stationary time series $y_s$. In one or more embodiments, the anomaly detection system 102 can further correlate the identified significant spikes to the corresponding indices of the spike-component series to determine that a subseries of the spike-component series represents a statistically significant anomaly.

As noted above, the anomaly detection system 102 can identify significant anomalous data values of a level-component series (e.g., as in the act 418) by determining whether a level change corresponding to a level-component series satisfies a level-change-significance threshold. For example, in at least one embodiment, the anomaly detection system 102 can determine that a level change satisfies the level-change-significance threshold when that level change represents a deviation from a significant-level-change value. To illustrate, the anomaly detection system 102 can determine a level change represented between two sequential indices of the level-component series is significant if $|\Delta t| \geq t\alpha/2SE(\mu)$, where $t\alpha/2$ is the critical value of a Gaussian distribution at a significance level of $\alpha$. If a level change represented between two sequential indices of the level-component series satisfies this threshold value, the anomaly detection system 102 identifies that level change as significant.

As further shown in FIG. 4, the anomaly detection system 102 can additionally modify the metrics time series and/or one or more of the latent-component series to further increase the accuracy of anomaly detection. In particular, the anomaly detection system 102 determines whether there is a matching previous spike or dip in an analogous time period 420. For example, the anomaly detection system 102 can identify a data value of the spike-component series corresponding to a time period and identify a matching previous data value of a previous spike-component series corresponding to an analogous time period. Such a previous data value of the previous spike-component series may correspond or match the data value of the spike-component series in terms of index, time, or place within a time window. In response to identifying these matching data values from analogous time periods, in some embodiments, the anomaly detection system 102 does not identify the current spike/dip 422—or data value from the current spike-component series—as an anomaly to adjust for a periodic effect. In one or more embodiments, the anomaly detection system 102 can identify and account for a similar periodic effect in any latent-component series, such as the level-component series. In at least one embodiment, the anomaly detection system 102 can identify and account for a period effect in one or more latent-component series jointly or concurrently.

In more detail, the anomaly detection system 102 can determine one or more data values corresponding to a special-time effect or a special-day effect from the spike-component series d do not represent significant anomalies (e.g., as in the act 420). In one or more embodiments, the metrics time series may include significant spikes and/or dips that repeat at regular intervals because of regular events such as holidays, weekends, regular promotions, and so forth. In at least one embodiment, the anomaly detection system 102 can avoid identifying these regular spikes and/or dips as anomalous by determining whether a significant spike or dip in a current time period in the spike-component series d corresponds to a significant spike or dip in an analogous past time period.

To further illustrate, for every significantly valued index identified in the current spike-component series, the anomaly detection system 102 can identify the value represented at the same index in a past spike-component series. If the value at the same index in the past spike-component series is the same as that in the current spike-component series, the anomaly detection system 102 can determine that a special day or time effect exists at the date and/or time represented by the index. In response to determining that the special day or time effect exists at that index (e.g., "Yes" at 420), the anomaly detection system 102 can determine not to identify that index and its value from the current spike-component series 422 as an anomaly. In one or more embodiments, the anomaly detection system 102 can identify year-over-year special day or time effects, month-over-month special day or time effects, week-over-week special day or time effects, and so forth.

After identifying the significant anomalous data values based on latent components of the metrics time series, the anomaly detection system 102 can generate anomalous data values for display 424. For example, the anomaly detection system 102 can generate one or more interactive graphical user interfaces that include a visual representation of the anomalous data values in relation to the metrics time series and its latent-component series. In one or more embodiments, the anomaly detection system 102 can provide the generated anomalous data values for display on a client computing device (e.g., such as the administrator computing device 108, shown in FIG. 1).

Figure 5A:
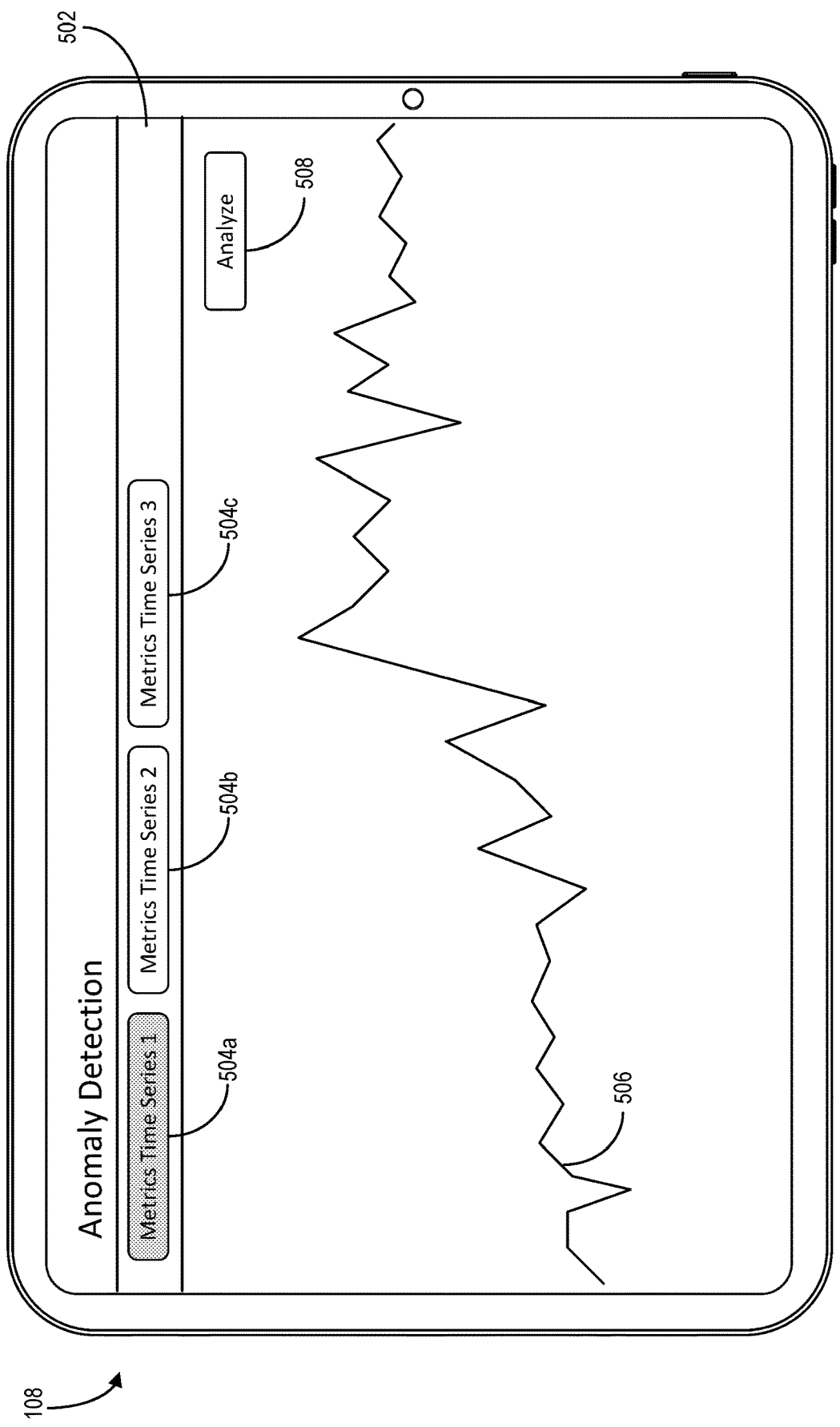
FIG. 5A-5D illustrate graphical user interfaces for selecting a metrics time series, determining latent components of the metrics time series, and identifying anomalous data associated with a selected metrics time series in accordance with one or more embodiments.

FIGS. 5A-5D illustrate a graphical user interface visually indicating anomalous data associated with a selected metrics time series. For example, as shown in FIG. 5A, the anomaly detection system 102 can generate a graphical user interface 502 for display on the administrator computing device 108. In one or more embodiments, the anomaly detection system 102 can generate the graphical user interface 502 with metrics-time-series elements 504a, 504b, and 504c. For example, the anomaly detection system 102 can generate metrics-time-series elements 504a, 504b, and 504c in response to receiving a query from the administrator computing device 108 specifying an application or website, one or more types of user interactions associated with the application or website, target demographic information, and/or a time period. Thus, in response to a detected selection of the metrics-time-series element 504a, the anomaly detection system 102 can generate a metrics-time series 506 corresponding to the metrics time series associated with that selected element.

As shown in FIG. 5A, the graphical user interface 502 can further include an analyze button 508. In one or more embodiments, in response to a detected selection of the analyze button 508, the anomaly detection system 102 can determine latent components of the selected metrics time series and identify significant anomalies based on the latent components. The data analytics system 104 can further generate the significant anomalies for display on the administrator computing device 108 within the graphical user interface 502.

Figure 5B:
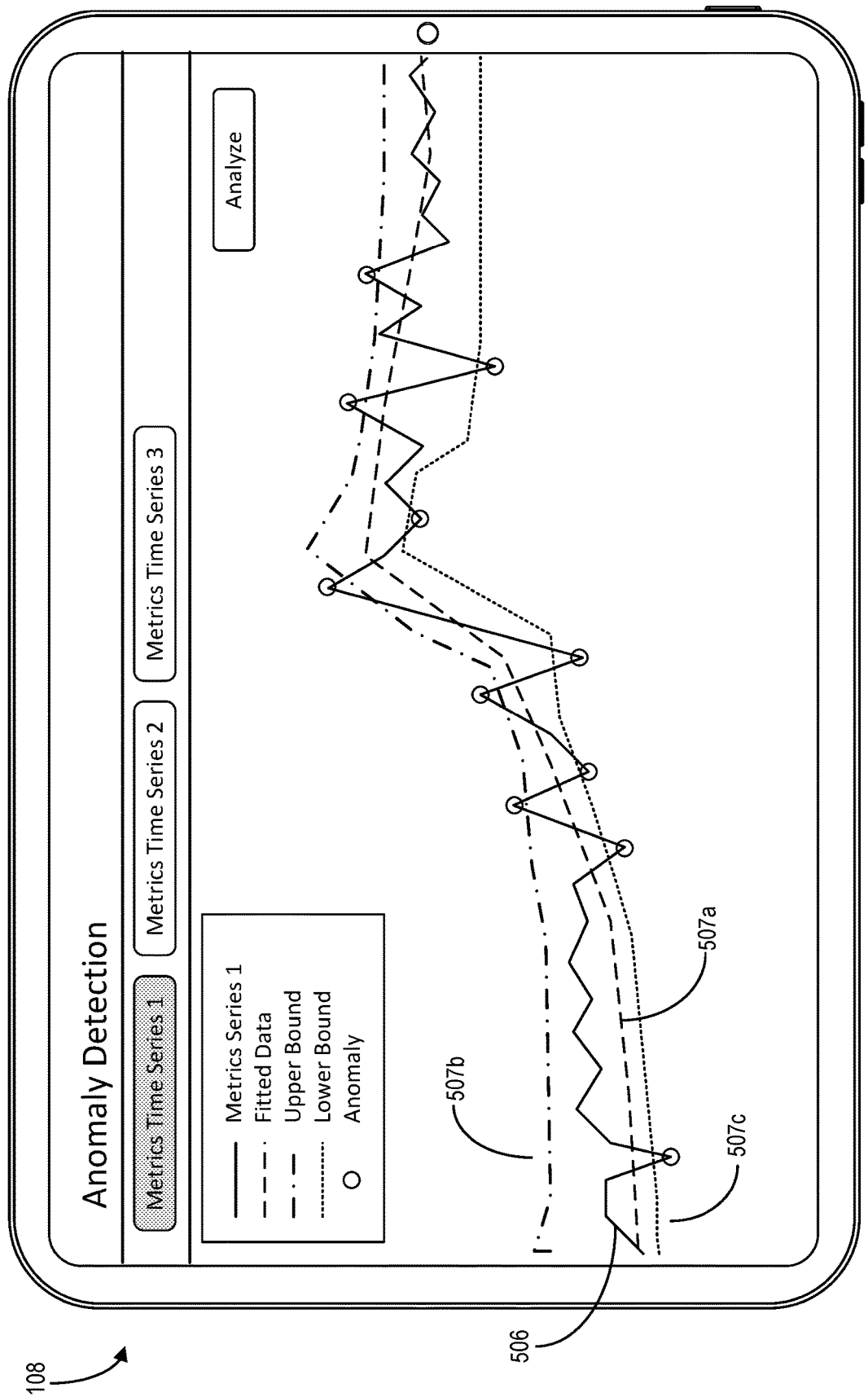

To further illustrate some of the advantages of the anomaly detection system 102, FIG. 5B illustrates a displayed output of an existing analytics computing system. For example, in performing the analysis of the metrics time series associated with the metrics-time series 506 illustrated in FIG. 5B, the existing analytics computing system identifies data with hourly granularity, a confidence level of 99, and some 336 points (e.g., approximately half the metrics time series) as training periods. The existing system analyzes the metrics time series associated with the metrics-time series 506 to identify a fitted data series 507a, an upper bound 507b, and a lower bound 507c, as shown in FIG. 5B. Additionally, the existing system can identify multiple anomalies associated with the metrics time series, which may or may not include non-real values. As shown in FIG. 5B, the existing system identifies a high number of anomalies that are potentially insignificant. Moreover, the existing system may have identified the high number of anomalies as a result of using the first half of the data values in the time series as training periods even though those data values are not correlated to the second half of the data values in the time series, as indicated by an undetected level change (e.g., near the middle of the metrics-time series 506). In some cases, the existing system identifies the anomalies shown in FIG. 5B by executing the optimization algorithm (1) described above.

Figure 5C:
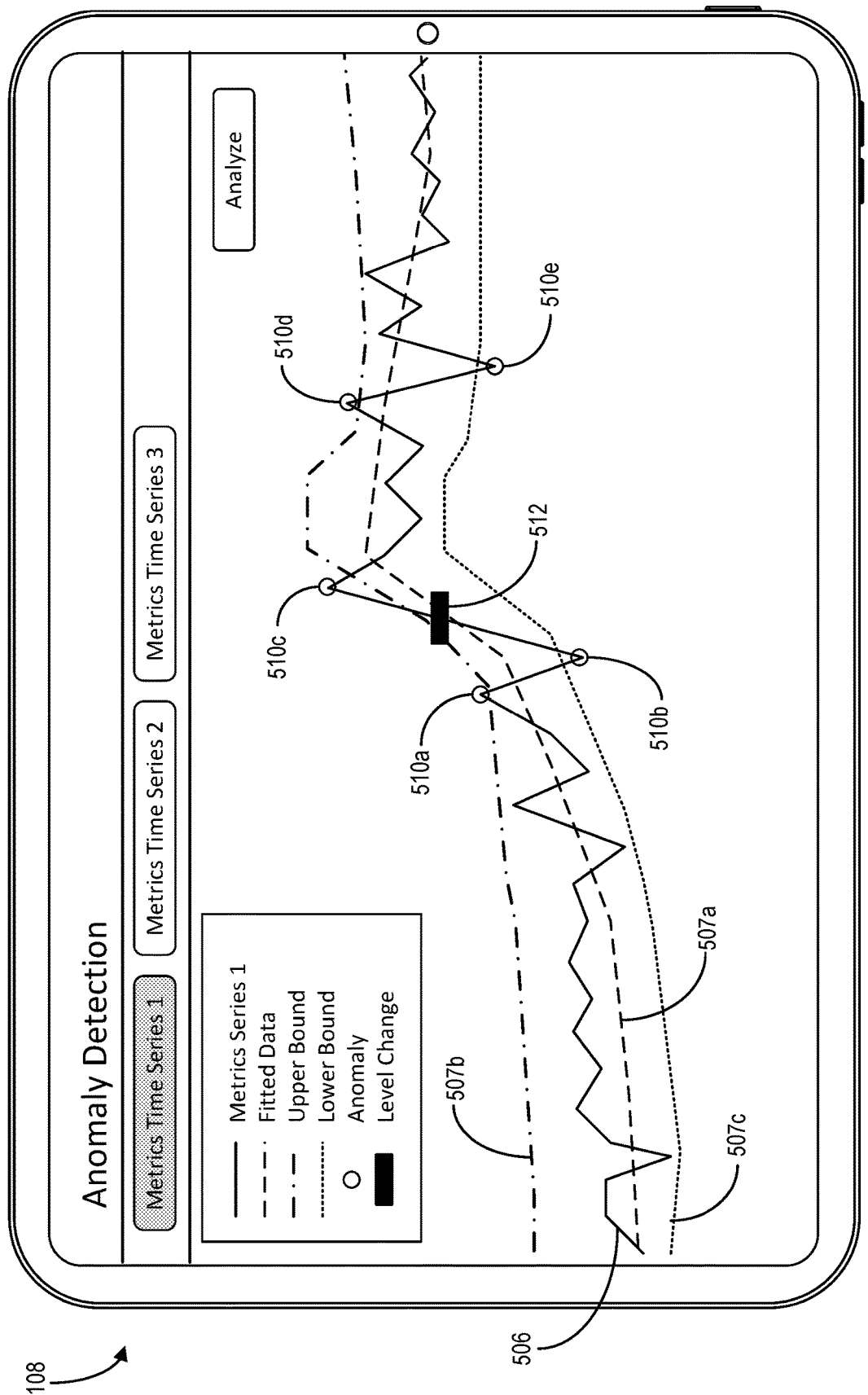

In contrast to the existing analytics computing system, the anomaly detection system 102 identifies significant anomalies from the metrics time series. For example, as shown in FIG. 5C, the anomaly detection system 102 can identify the metrics-time series 506, the fitted data series 507a, the upper bounds 507b, and the lower bounds 507c. In some cases, the anomaly detection system 102 identifies the anomalies shown in FIG. 5C by executing the optimization algorithm (2) described above. Moreover, the anomaly detection system 102 can determine significant anomalies 510a, 510b, 510c, 510d, and 510e, and the significant level change 512. As shown, the significant anomalies 510a, 510b, 510c, 510d, and 510e, and the significant level change 512 represent fewer anomalous data values in FIG. 5C than those identified by the existing system shown in FIG. 5B, thus lending more meaningful insights to an analyst.

Figure 5D:
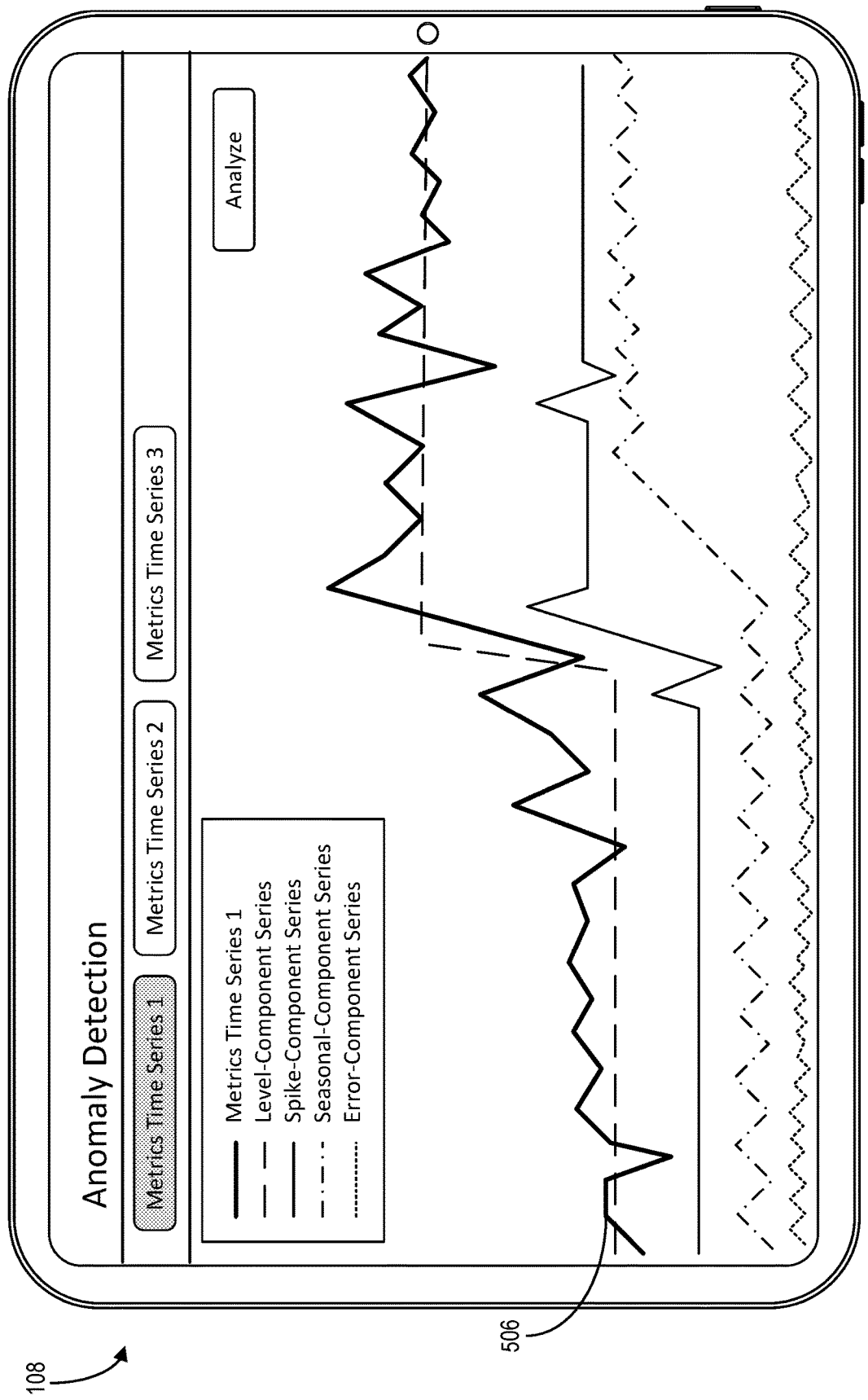

In one or more embodiments, as shown in FIG. 5D, the anomaly detection system 102 can further generate trends associated with the latent components of the selected metrics time series. For example, the anomaly detection system 102 can generate trends for a level-component series, a spike-component series, a seasonal-component series, and an error-component series using the optimization algorithm (2) described above. The anomaly detection system 102 can display each of these trends overlaid on the metrics-time series 506, or can display each trend individually. By displaying the latent component trends in association with the metrics-time series 506, the anomaly detection system 102 provides an efficient analytic tool that enables an administrator to quickly see significant spikes and level changes relative to the selected metrics time series.

Figure 6:
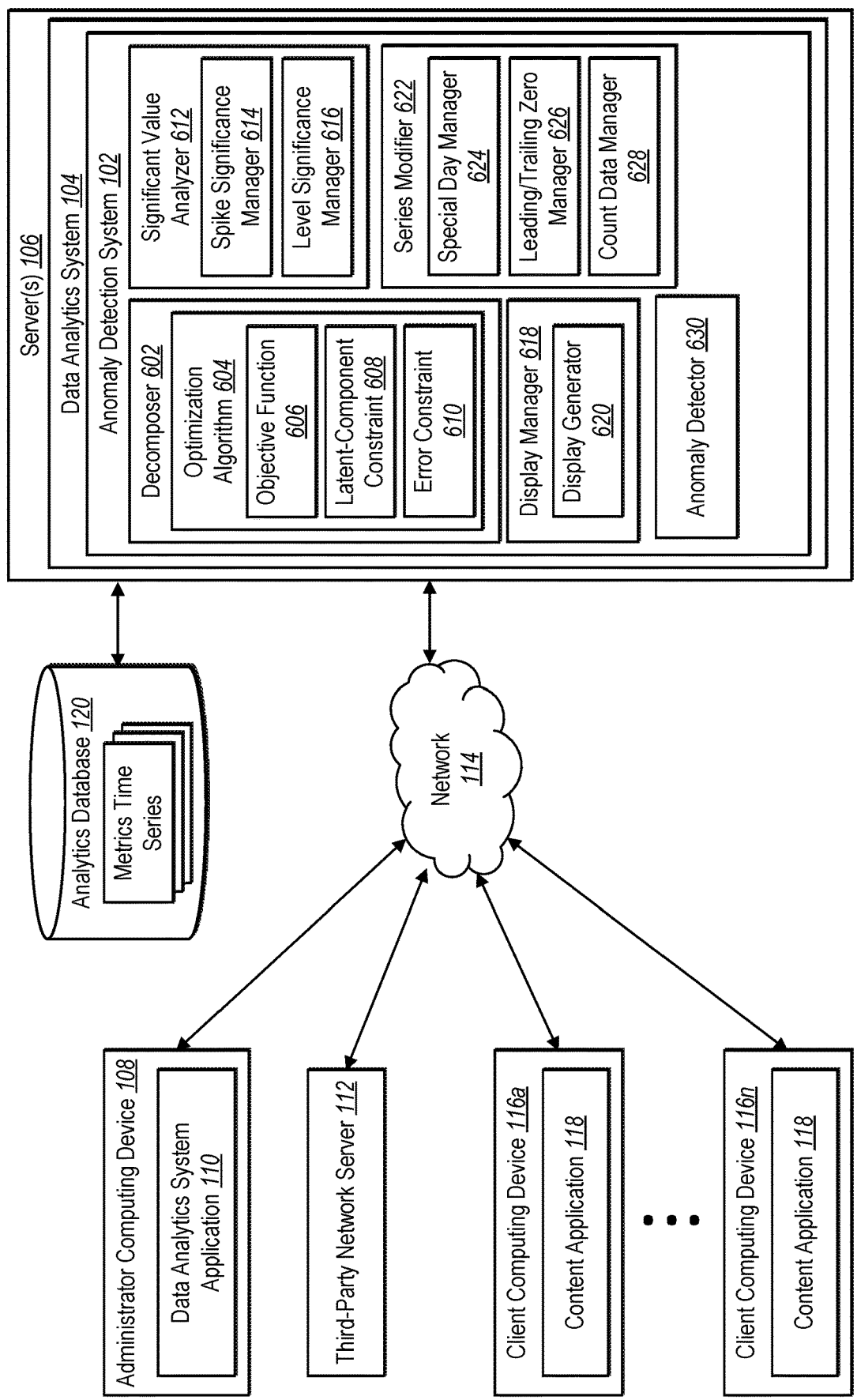
FIG. 6 illustrates a schematic diagram of the anomaly detection system in accordance with one or more embodiments.

As described in relation in FIGS. 1-5D, the anomaly detection system 102 performs operations for identifying significant anomalies in latent components of a metrics time series. FIG. 6 illustrates a detailed schematic diagram of an embodiment of the anomaly detection system 102 described above. Although illustrated on the server(s) 106, as mentioned above, the anomaly detection system 102 can be implemented by one or more different or additional computing devices (e.g., the administrator computing device 108). In one or more embodiments, the anomaly detection system 102 includes a decomposer 602, a significant value analyzer 612, a display manager 618, a series modifier 622, and an anomaly detector 630.

As mentioned above, and as shown in FIG. 6, the anomaly detection system 102 includes a decomposer 602. In one or more embodiments, the decomposer 602 includes the optimization algorithm 604 (e.g., the optimization algorithm (2) which is a modification of the optimization algorithm (1)), which in turn includes the objective function 606 (e.g., $\min_{(s,t,d,e)} \|Fs\|_1 + w_1\|\Delta t\|_1 + w_2\|d\|_1$), the latent-component constraint 608 (e.g., Subject to y[ind] =s[ind]+t[ind]+d[ind]+e[ind]), and the error constraint 610 (e.g., $\|e\|_2 \leq \rho$). As discussed above, the anomaly detection system 102 can modify, reconfigure, or execute one or more components of the decomposer 602 such that the optimization algorithm 604 can allow for non-real values in a metrics time series, as well as low event counts associated with the metrics time series (e.g., a metrics time series retrieved from the analytics database 120).

As mentioned above, and as shown in FIG. 6, the anomaly detection system 102 includes a significant value analyzer 612. In one or more embodiments, the significant value analyzer 612 can include a spike significance manager 614 and a level significance manager 616. For example, the spike significance manager 614 can identify a significant value in a spike-component series by determining that the value satisfies a spike-significance threshold. Similarly, the level significance manager 616 can identify a significant level change corresponding to a level-component series by determining that the level change satisfies a level-change-significance threshold.

As mentioned above, and as shown in FIG. 6, the anomaly detection system 102 includes a series modifier 622. In one or more embodiments, the series modifier 622 includes a special day manager 624, a leading/trailing zero manager 626, and a count data manager 628. For example, the special day manager 624 can identify a special day or time effect associated with a metrics time series and determine not to mark such values reflecting a special day or time effect as anomalies. The leading/trailing zero manager 626 can identify and remove leading and/or trailing zeros in a metrics time series. The count data manager 628 can decrease a confidence interval of the error constraint 610 based on determining that a number of values in the metrics time series is less than or equal to a threshold number.

As mentioned above, and as shown in FIG. 6, the anomaly detection system 102 includes a display manager 618 including a display generator 620. In one or more embodiments, the display generator 620 configures a graphical user interface with metrics time series data, latent component data, and anomaly data. The display generator 620 can further provide the graphical user interface to an administrator computing device for display and further interaction. In response to detected interactions with the graphical user interface, the display generator 620 can update the graphical user interface with additional or different data.

As mentioned above, and as shown in FIG. 6, the anomaly detection system 102 includes an anomaly detector 630. In one or more embodiments, the anomaly detector 630 includes the functionality for concurrently determining whether values of one or more latent components of a metrics time series represent anomalies. For example, the anomaly detector 630 can analyze a spike-component series to identify one or more anomalous spikes and the provide those identified anomalous spikes to the significant value analyzer 612 to further determine if any of the anomalous spikes are significant in the metrics time series.

Each of the components 602-630 of the anomaly detection system 102 can include software, hardware, or both. For example, the components 602-630 can include one or more instructions stored on a computer-readable storage medium and executable by processors of one or more computing devices, such as a client device or server device. When executed by the one or more processors, the computer-executable instructions of the anomaly detection system 102 can cause the computing device(s) to perform the methods described herein. Alternatively, the components 602-630 can include hardware, such as a special-purpose processing device to perform a certain function or group of functions. Alternatively, the components 602-630 of the anomaly detection system 102 can include a combination of computer-executable instructions and hardware.

Furthermore, the components 602-630 of the anomaly detection system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-630 may be implemented as a stand-alone application, such as a desktop or mobile application. Furthermore, the components 602-630 may be implemented as one or more web-based applications hosted on a remote server. The components 602-630 may also be implemented in a suite of mobile device applications or "apps." To illustrate, the components 602-630 may be implemented in an application, including but not limited to ADOBE ANALYTICS CLOUD, such as ADOBE ANALYTICS, ADOBE AUDIENCE MANAGER, ADOBE CAMPAIGN, ADOBE EXPERIENCE MANAGER, and ADOBE TARGET. "ADOBE", "ANALYTICS CLOUD", "ANALYTICS", "AUDIENCE MANAGER", "CAMPAIGN", "EXPERIENCE MANAGER", "TARGET," and "CREATIVE CLOUD" are either registered trademarks or trademarks of Adobe Systems Incorporated in the United States and/or other countries.

Figure 7:
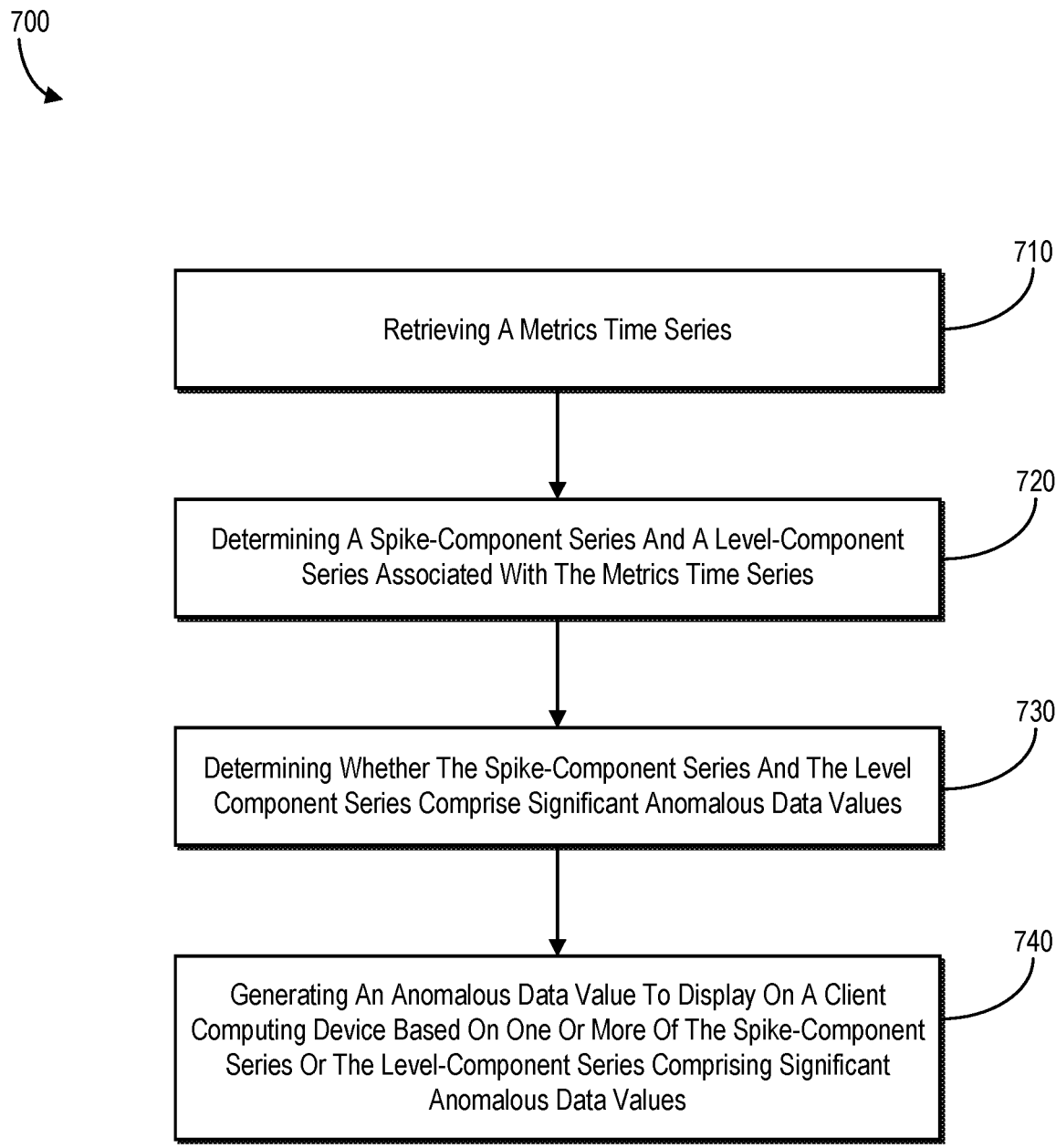
FIG. 7 illustrates a flowchart of determining latent components of a metrics time series and identifying anomalous data within the metrics time series based on one or both of spikes and level changes from the latent components satisfying significance thresholds in accordance with one or more embodiments.
Figure 8:
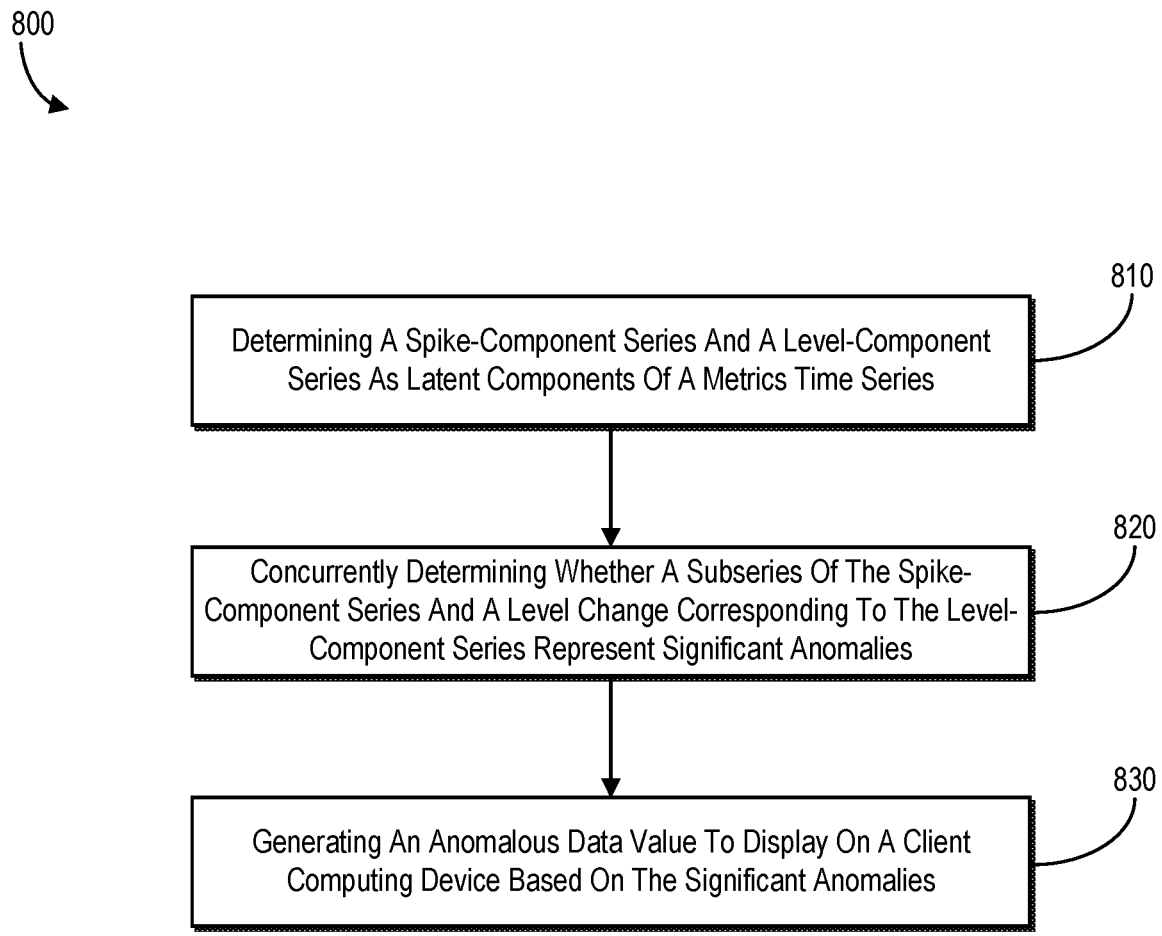
FIG. 8 illustrates a flowchart of concurrently determining whether a subseries of the spike-component series and a level change corresponding to the level-component series represent significant anomalies in accordance with one or more embodiments.

FIGS. 1-6, the corresponding text, and the examples provide a number of different methods, systems, devices, and non-transitory computer-readable media of the anomaly detection system 102. In addition to the foregoing, one or more embodiments can also be described in terms of flowcharts comprising acts for accomplishing a particular result, as shown in FIGS. 7 and 8. FIGS. 7 and 8 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for identifying significant anomalies of one or more latent components of a metrics time series in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown in FIG. 7, the series of acts 700 includes an act 710 of retrieving a metrics time series. For example, the act 710 can involve retrieving a metrics time series comprising metric data values representing user actions within a digital network corresponding to a time period.

As further shown in FIG. 7, the series of acts 700 includes an act 720 of determining a spike-component series and a level-component series associated with the metrics time series. For example, the act 720 can involve determining at least a spike-component series and a level-component series as latent components of the metrics time series. In one or more embodiments, determining at least the spike-component series and the level-component series as latent components of the metrics time series can include: applying an optimization algorithm to the metrics time series subject to a latent-component constraint for real values indicating the metrics time series comprises at least the spike-component series and the level-component series; and based on the optimization algorithm, identifying the spike-component series and the level-component series as latent components of the metrics time series. In at least one embodiment, applying the optimization algorithm to non-real values can include: excluding non-real values from the latent-component constraint; and determining a seasonal-component series for non-real values based on a frequency domain.

As further shown in FIG. 7, the series of acts 700 includes an act 730 of determining whether the spike-component series and the level-component series comprise significant anomalous data values. For example, the act 730 can involve determining whether a subseries of the spike-component series satisfies a spike-significance threshold and a level change corresponding to the level-component series satisfy a level-change-significance threshold. In one or more embodiments, determining whether the subseries of the spike-component series satisfies the spike-significance threshold can include: generating a stationary time series that equals a combination of the spike-component series and a residual error value; conforming the stationary time series to a dataset following a normalized distribution; and determining data values of the stationary time series that deviate from the dataset following the normalized distribution. Additionally, in one or more embodiments, determining that the level change corresponding to the level-component series satisfies the level-change-significance threshold can include: generating a significant-level-change value; and determining that an absolute value of the level change corresponding to the level-component series exceeds or equals the significant-level-change value.

As further shown in FIG. 7, the series of acts 700 includes an act 740 of generating an anomalous data value to display on a client computing device based on one or more of the spike-component series or the level-component series comprising significant anomalous data values. For example, the act 740 can involve generating, from the metrics time series, an anomalous data value to display on a client computing device based on one or more of the subseries of the spike-component series satisfying the spike-significance threshold or the level change corresponding to the level-component series satisfying the level-change-significance threshold.

Furthermore, in one or more embodiments, the series of acts 700 includes an act of applying an objective function of the optimization algorithm to an infinity value from the metrics time series by replacing the spike-component series with the metrics time series. Additionally, in at least one embodiment, the series of acts 700 includes an act of applying the latent-component constraint for real values to the optimization algorithm by constraining the metrics time series to comprise a sum of the spike-component series, the level-component series, a seasonal-component series, and an error-component series.

In one or more embodiments, the series of acts 700 includes acts of identifying a data value of the spike-component series corresponding to the time period and a previous data value of a previous spike-component series corresponding to an analogous time period; and determining the data value of the spike-component series does not represent an anomaly to adjust for a periodic effect. In at least one embodiment, the series of acts 700 also includes an act of determining at least the spike-component series and the level-component series as latent components of the metrics time series by applying an optimization algorithm to the metrics time series without separating the metrics time series into data values for a training period and data values for a testing period.

FIG. 8 illustrates a flowchart of a series of acts 800 for concurrently determining whether a subseries of the spike-component series and a level change corresponding to the level-component series represent significant anomalies in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 810 of determining a spike-component series and a level-component series as latent components of a metrics time series. For example, the act 810 can involve determining at least a level-component series and a spike-component series as latent components of the metrics time series subject to a latent-component constraint and excluding non-real values of the metrics time series from the latent-component constraint. In one or more embodiments, determining at least the level-component series and the spike-component series as latent components of the metrics time series can include: applying an optimization algorithm to the metrics time series subject to a latent-component constraint for real values indicating the metrics time series comprises the spike-component series, the level-component series, a seasonal-component series, and an error-component series; and based on the optimization algorithm, identifying the spike-component series, the level-component series, the seasonal-component series, and the error-component series as latent components of the metrics time series.

In at least one embodiment, the series of acts 800 further includes acts of: applying the optimization algorithm to the metrics time series subject to an error constraint limiting the error-component series to a confidence interval; determining that the metric data values within the metrics time series equal or fall below a threshold number of data values and that each metric data value is non-negative; and based on determining that the metric data values equal or fall below the threshold number of data values, decreasing the confidence interval for the error constraint.

Furthermore, in at least one embodiment, the series of acts 800 includes acts of: excluding non-available values or non-number values from the latent-component constraint; and determining a seasonal-component series for non-real values based on a frequency domain. The series of acts 800 can also include an act of removing at least one of leading zero values or trailing zero values from the metrics time series. Additionally, series of acts 800 can also include an act of determining at least the spike-component series and the level-component series as latent components of the metrics time series by applying an optimization algorithm to the metrics time series without separating the metrics time series into data values for a training period and data values for a testing period.

As shown in FIG. 8, the series of acts 800 includes an act 820 of concurrently determining whether a subseries of the spike-component series and a level change corresponding to the level-component series represent significant anomalies. For example, the act 820 can involve concurrently determining whether a subseries of the spike-component series and a level change corresponding to the level-component series represent significant anomalies by: determining whether a stationary time series equaling a combination of the spike-component series and a residual error value deviates from a dataset following a distribution; and determining whether the level change corresponding to the level-component series deviates from a significant-level-change value according to a level-change-significance threshold.

In at least one embodiment, determining whether the stationary time series equaling the combination of the spike-component series and the residual error value deviates from the dataset following the distribution can include: determining the residual error value by applying an autoregressive model to an error-component series within the metrics time series; and applying a Generalized Extreme Studentized Distribution ("GESD") test to the stationary time series equaling the combination of the spike-component series and the residual error value.

Additionally, in at least one embodiment, determining whether the level change corresponding to the level-component series deviates from the significant-level-change value according to the level-change-significance threshold can include: generating a normalized distribution according to a significance level; determining the significance-level-change value from the normalized distribution; and determining that an absolute value of the level change corresponding to the level-component series exceeds or equals a product of the significance-level-change value and the residual error value.

As shown in FIG. 8, the series of acts 800 includes an act 830 of generating an anomalous data value to display on a client computing device based on the significant anomalies. For example, the act 830 can involve generating, from the metrics time series, an anomalous data value to display on a client computing device based on one or more of the subseries of the spike-component series or the level change representing a significant anomaly. In at least one embodiment, the series of acts 800 can include an act of generating a graphical user interface visually indicating the anomalous data value within the metrics time series.

In the alternative to the acts described above, in some embodiments, the anomaly detection system 102 performs a step for identifying significant anomalous data values from a level-component series or a spike-component series within the metrics time series. In particular, the algorithm and acts described above in relation to FIG. 3 or FIG. 4 can comprise the acts (or structure) corresponding to a step for identifying significant anomalous data values from a level-component series or a spike-component series within the metrics time series.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
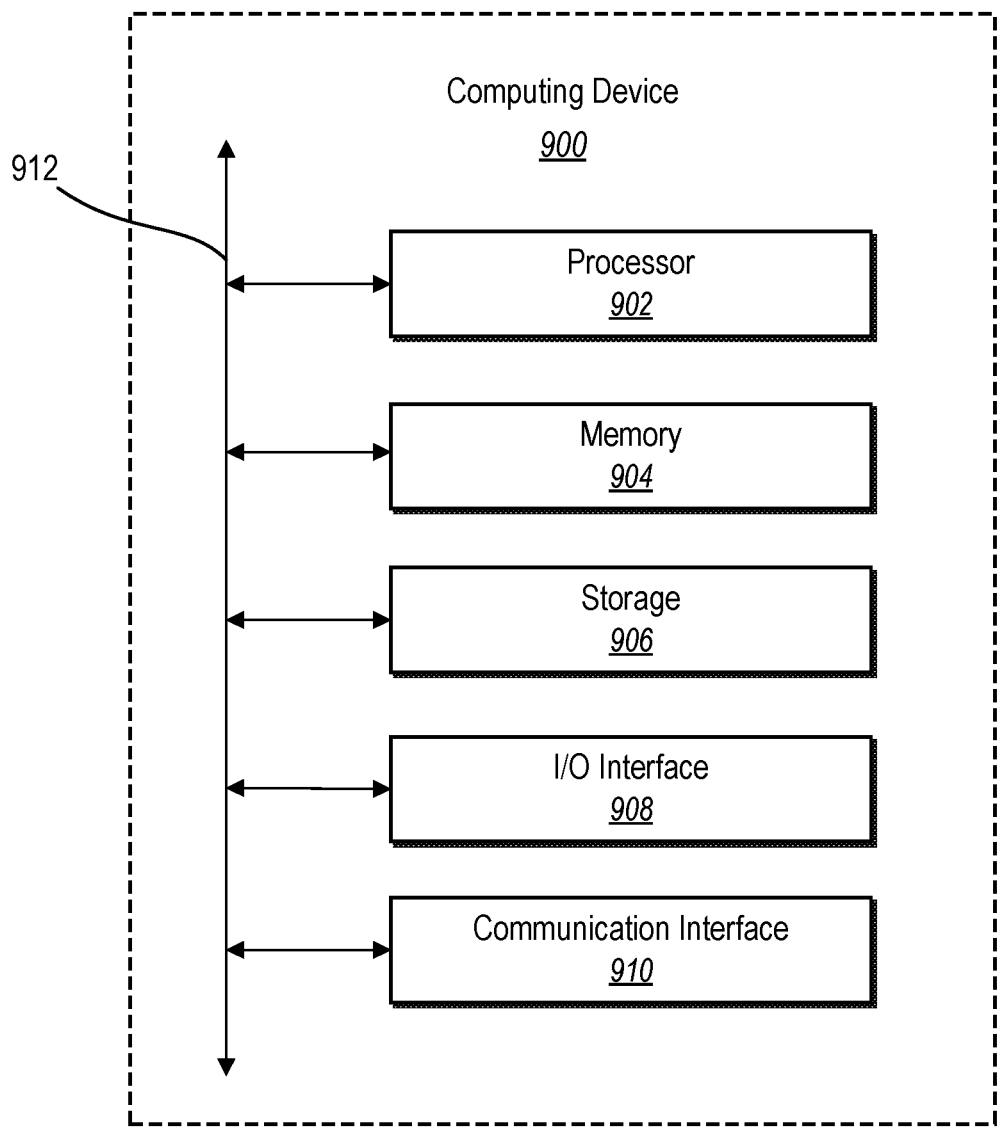
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 106, the administrator computing device 108). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:
    retrieve a metrics time series comprising metric data values representing user actions within a digital network corresponding to a time period;
    determine at least a spike-component series and a level-component series as latent components of the metrics time series by:
        applying an optimization algorithm to the metrics time series subject to a latent-component constraint for real values indicating the metrics time series comprises at least the spike-component series and the level-component series; and
        based on the optimization algorithm, identifying the spike-component series and the level-component series as latent components of the metrics time series;
    determine whether a subseries of the spike-component series satisfies a spike-significance threshold and a level change corresponding to the level-component series satisfies a level-change-significance threshold; and
    generate, from the metrics time series, an anomalous data value to display on a client computing device based on one or more of the subseries of the spike-component series satisfying the spike-significance threshold or the level change corresponding to the level-component series satisfying the level-change-significance threshold.

2. The non-transitory computer-readable medium as recited in claim 1, further storing instructions that, when executed by the at least one processor, cause the computing device to determine whether the subseries of the spike-component series satisfies the spike-significance threshold by:
    generating a stationary time series that equals a combination of the spike-component series and a residual error value; and
    determining the stationary time series deviates from a dataset following a normalized distribution.

3. The non-transitory computer-readable medium as recited in claim 1, further storing instructions that, when executed by the at least one processor, cause the computing device to determine that the level change corresponding to the level-component series satisfies the level-change-significance threshold by:
    generating a significant-level-change value; and
    determining that an absolute value of the level change corresponding to the level-component series exceeds or equals the significant-level-change value.

4. The non-transitory computer-readable medium as recited in claim 1, further storing instructions that, when executed by the at least one processor, cause the computing device to apply the optimization algorithm to non-real values by:
  excluding non-real values from the latent-component constraint; and
  determining a seasonal-component series for the non-real values based on a frequency domain.

5. The non-transitory computer-readable medium as recited in claim 1, further storing instructions that, when executed by the at least one processor, cause the computing device to apply an objective function of the optimization algorithm to an infinity value from the metrics time series by replacing the spike-component series with the metrics time series.

6. The non-transitory computer-readable medium as recited in claim 1, further storing instructions that, when executed by the at least one processor, cause the computing device to apply the latent-component constraint for real values to the optimization algorithm by constraining the metrics time series to comprise a sum of the spike-component series, the level-component series, a seasonal-component series, and an error-component series.

7. The non-transitory computer-readable medium as recited in claim 1, further storing instructions that, when executed by the at least one processor, cause the computing device to:
  identify a data value of the spike-component series corresponding to the time period and a previous data value of a previous spike-component series corresponding to an analogous time period; and
  determine the data value of the spike-component series does not represent an anomaly to adjust for a periodic effect.

8. The non-transitory computer-readable medium as recited in claim 1, further storing instructions that, when executed by the at least one processor, cause the computing device to determine at least the spike-component series and the level-component series as latent components of the metrics time series by applying the optimization algorithm to the metrics time series without separating the metrics time series into data values for a training period and data values for a testing period.

9. A system comprising:
  at least one memory device comprising a metrics time series including metric data values representing user actions within a digital network corresponding to a time period; and
  at least one computing device configured to cause the system to:
    determine at least a level-component series and a spike-component series as latent components of the metrics time series subject to a latent-component constraint and excluding non-real values of the metrics time series from the latent-component constraint;
    concurrently determine whether a subseries of the spike-component series and a level change corresponding to the level-component series represent significant anomalies by:
      determining whether a stationary time series equaling a combination of the spike-component series and a residual error value deviates from a dataset following a distribution; and
      determining whether the level change corresponding to the level-component series deviates from a significant-level-change value according to a level-change-significance threshold; and
    generate, from the metrics time series, an anomalous data value to display on a client computing device based on one or more of the subseries of the spike-component series or the level change representing a significant anomaly.

10. The system as recited in claim 9, wherein the at least one computing device is further configured to cause the system to generate a graphical user interface visually indicating the anomalous data value within the metrics time series.

11. The system as recited in claim 9, wherein the at least one computing device is further configured to cause the system to determine whether the stationary time series equaling the combination of the spike-component series and the residual error value deviates from the dataset following the distribution by:
  determining the residual error value by applying an autoregressive model to an error-component series within the metrics time series; and
  applying a Generalized Extreme Studentized Distribution test to the stationary time series equaling the combination of the spike-component series and the residual error value.

12. The system as recited in claim 9, wherein the at least one computing device is further configured to cause the system to determine whether the level change corresponding to the level-component series deviates from the significant-level-change value according to the level-change-significance threshold by:
  generating a normalized distribution according to a significance level;
  determining the significance-level-change value from the normalized distribution; and
  determining that an absolute value of the level change corresponding to the level-component series exceeds or equals a product of the significance-level-change value and the residual error value.

13. The system as recited in claim 9, wherein the at least one computing device is further configured to cause the system to determine at least the level-component series and the spike-component series as latent components of the metrics time series by:
  applying an optimization algorithm to the metrics time series subject to a latent-component constraint for real values indicating the metrics time series comprises the spike-component series, the level-component series, a seasonal-component series, and an error-component series; and
  based on the optimization algorithm, identifying the spike-component series, the level-component series, the seasonal-component series, and the error-component series as latent components of the metrics time series.

14. The system as recited in claim 13, wherein the at least one computing device is further configured to:
  apply the optimization algorithm to the metrics time series subject to an error constraint limiting the error-component series to a confidence interval;
  determine that the metric data values within the metrics time series equal or fall below a threshold number of data values and that each metric data value is non-negative; and
  based on determining that the metric data values equal or fall below the threshold number of data values, decreasing the confidence interval for the error constraint.

15. The system as recited in claim 13, wherein the at least one computing device is further configured to:
excluding non-available values or non-number values from the latent-component constraint; and
determine a seasonal-component series for non-real values based on a frequency domain.

16. The system as recited in claim 9, wherein the at least one computing device is further configured to cause the system to remove at least one of leading zero values or trailing zero values from the metrics time series.

17. The system as recited in claim 9, wherein the at least one computing device is further configured to cause the system to determine at least the spike-component series and the level-component series as latent components of the metrics time series by applying an optimization algorithm to the metrics time series without separating the metrics time series into data values for a training period and data values for a testing period.

18. In a digital medium environment for analyzing traffic data, a method for determining anomalies from metrics time series comprising:
accessing a metrics time series comprising metric data points representing user actions within a digital network corresponding to a time period;
determining at least a spike-component series and a level-component series as latent components of the metrics time series by:
applying an optimization algorithm to the metrics time series subject to a latent-component constraint for real values indicating the metrics time series comprises at least the spike-component series and the level-component series; and
based on the optimization algorithm, identifying the spike-component series and the level-component series as latent components of the metrics time series;
identifying significant anomalous data values from the level-component series or the spike-component series within the metrics time series; and
generating, from the metrics time series, a visual representation of an anomalous data value to display on a client computing device based on identifying the anomalous data value from the level-component series or the spike-component series.

19. The method of claim 18, wherein generating the visual representation of an anomalous data value to display on the client computing device comprises generating a graphical user interface visually indicating the anomalous data value within one or more of the metrics time series, the spike-component series, or the level-component series.

20. The method of claim 18, further comprising applying the optimization algorithm to non-real values by:
excluding non-real values from the latent-component constraint; and
determining a seasonal-component series for the non-real values based on a frequency domain.

* * * * *